United States Patent [19]

Cuniberti et al.

[11] 4,114,769
[45] Sep. 19, 1978

[54] ARTICLE TRANSFER METHOD

[75] Inventors: Mario Cuniberti, Columbus, Ohio; Edwin C. Pinsenschaum, Phoenix, Ariz.

[73] Assignee: Owens-Illinois, Inc., Toledo, Ohio

[21] Appl. No.: 759,216

[22] Filed: Jan. 13, 1977

Related U.S. Application Data

[62] Division of Ser. No. 662,054, Feb. 27, 1976, Pat. No. 4,018,342.

[51] Int. Cl.$^2$ ............................................. B65G 47/91
[52] U.S. Cl. .................................................. 214/152
[58] Field of Search ................. 214/1 B, 1 BS, 1 BB, 214/1 BT, 1 BD, 1 BV, 147 T, 1 S, 7, 152

[56] References Cited

U.S. PATENT DOCUMENTS

| 1,931,700 | 10/1933 | Murphy et al. | 214/1 S X |
| 3,419,375 | 12/1968 | Meiresonne | 214/1 BT X |
| 3,805,944 | 4/1974 | Yuryan | 214/1 BB X |
| 3,902,606 | 9/1975 | Rönbeck | 214/1 BV |
| 3,920,130 | 11/1975 | Edgett | 214/1 BD |
| 3,921,822 | 11/1975 | Dixon | 214/1 BB |

FOREIGN PATENT DOCUMENTS

| 2,186,977 | 1/1974 | France | 214/1 S |
| 6,701,507 | 8/1968 | Netherlands | 214/1 S |

Primary Examiner—Frank E. Werner
Attorney, Agent, or Firm—Richard B. Dence; D. H. Wilson; M. E. Click

[57] ABSTRACT

An automatically operable article transfer apparatus for successively picking up and transporting articles, such as the funnel components of cathode-ray tube assemblies, from a loading station to an article unloading station, and which during the course of transport of such articles is operable to effect a precise transpositional reorientation of each of the articles including pivoting or tilting the article, rotating the article and raising or lowering the article during such transport in such manner that all of such transpositional and reorientational movements are adjustably and cooperatively coordinateable to present the article in an adjustably preselectable and precisely predictable reoriented position at the work unloading station and which is further characterized by being designed to permit such orientational adjustability to be carried out to selectively vary the positional and orientational characteristics of the transfer apparatus at the work unloading station without disturbing the positional or orientational characteristics of the transfer apparatus at the article loading station.

4 Claims, 28 Drawing Figures

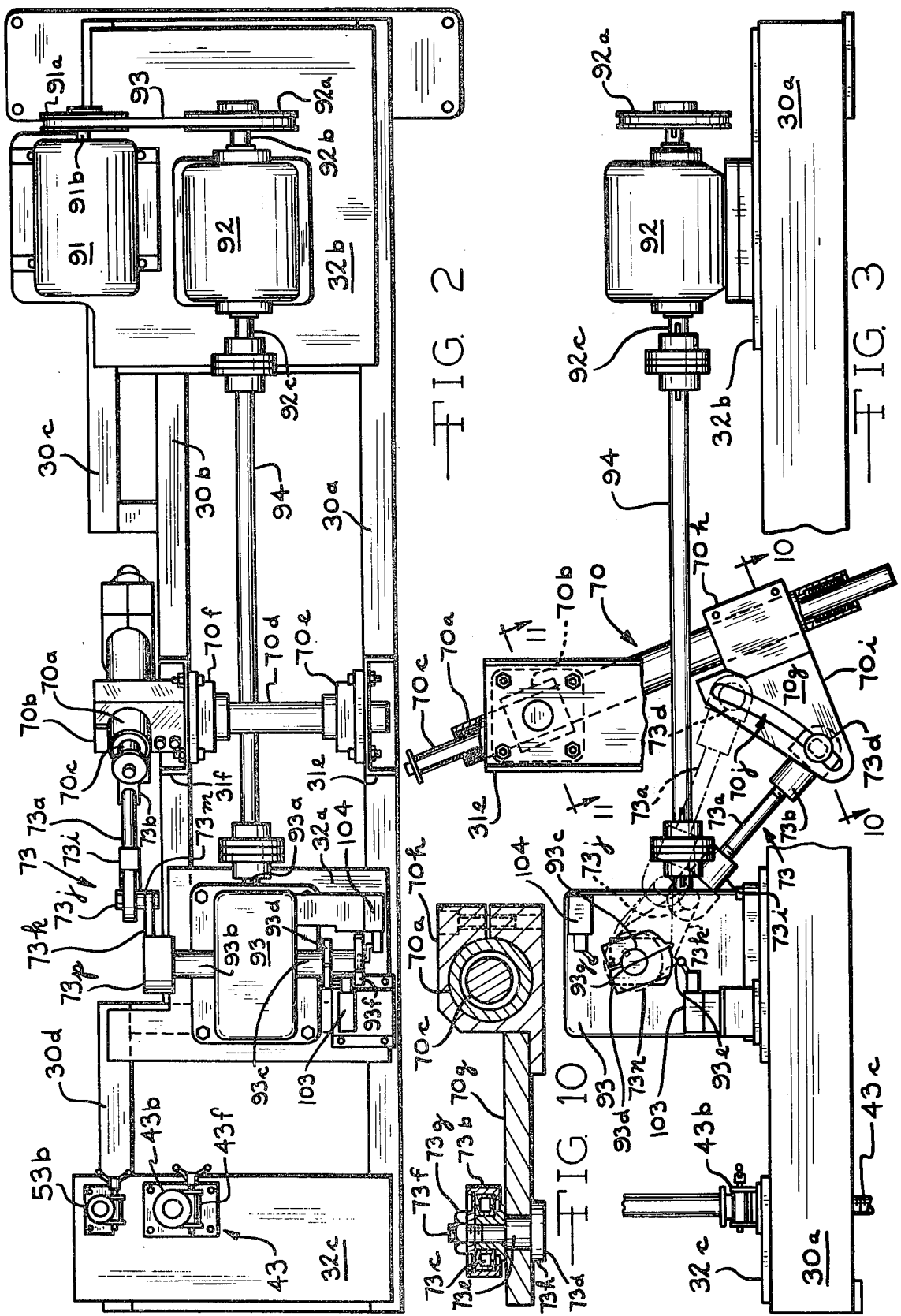

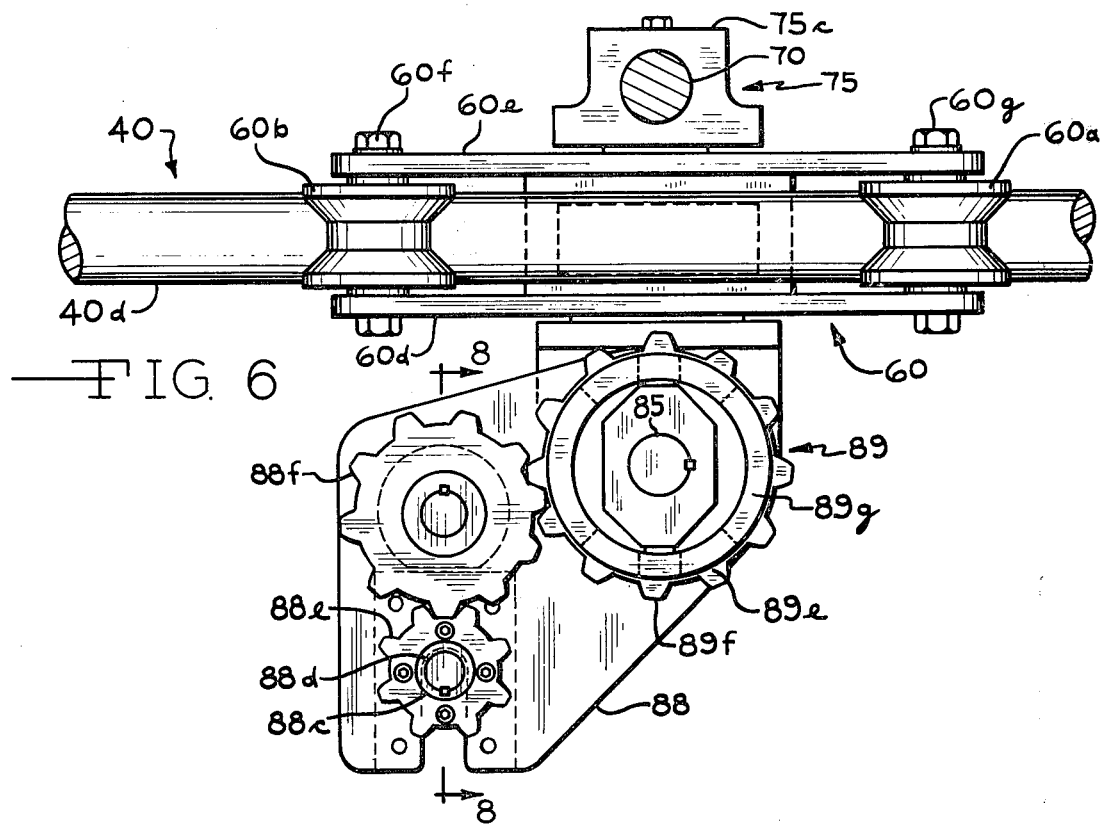
FIG. 6
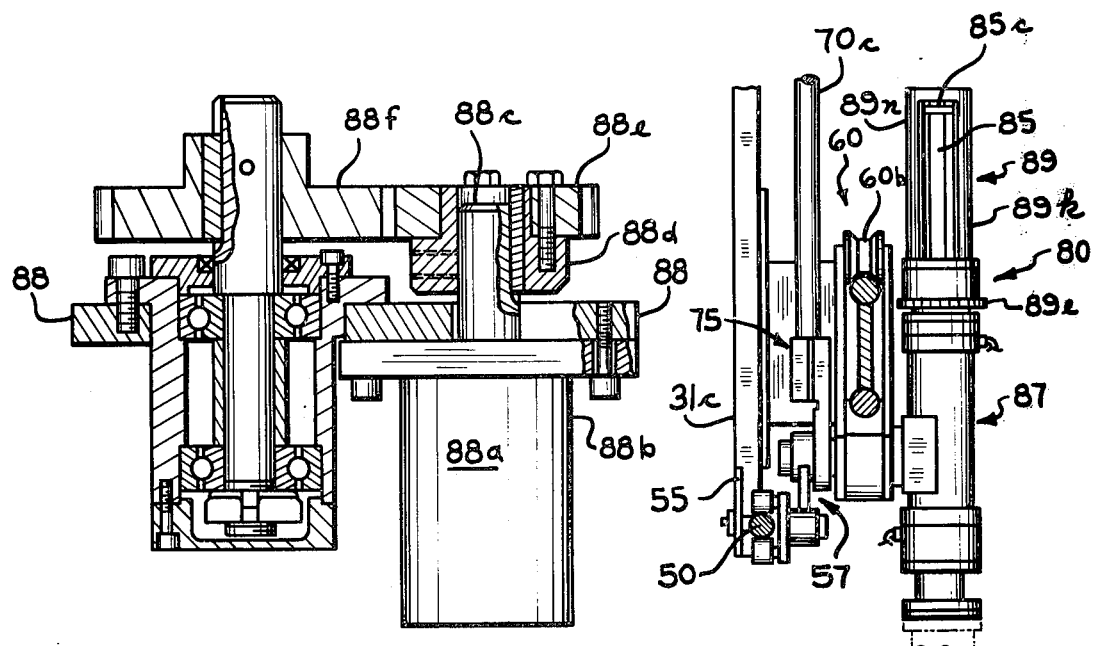
FIG. 8
FIG. 4

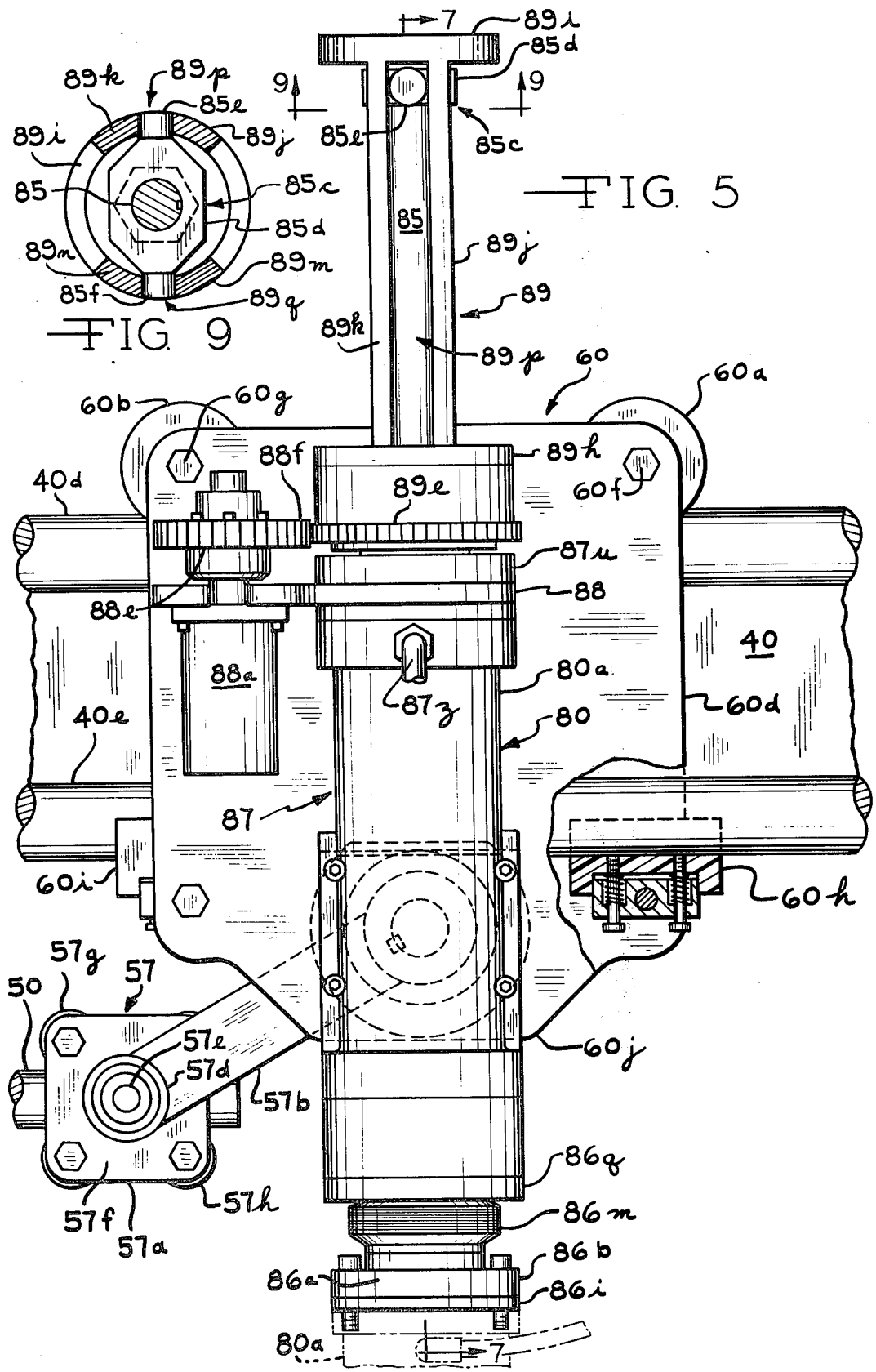

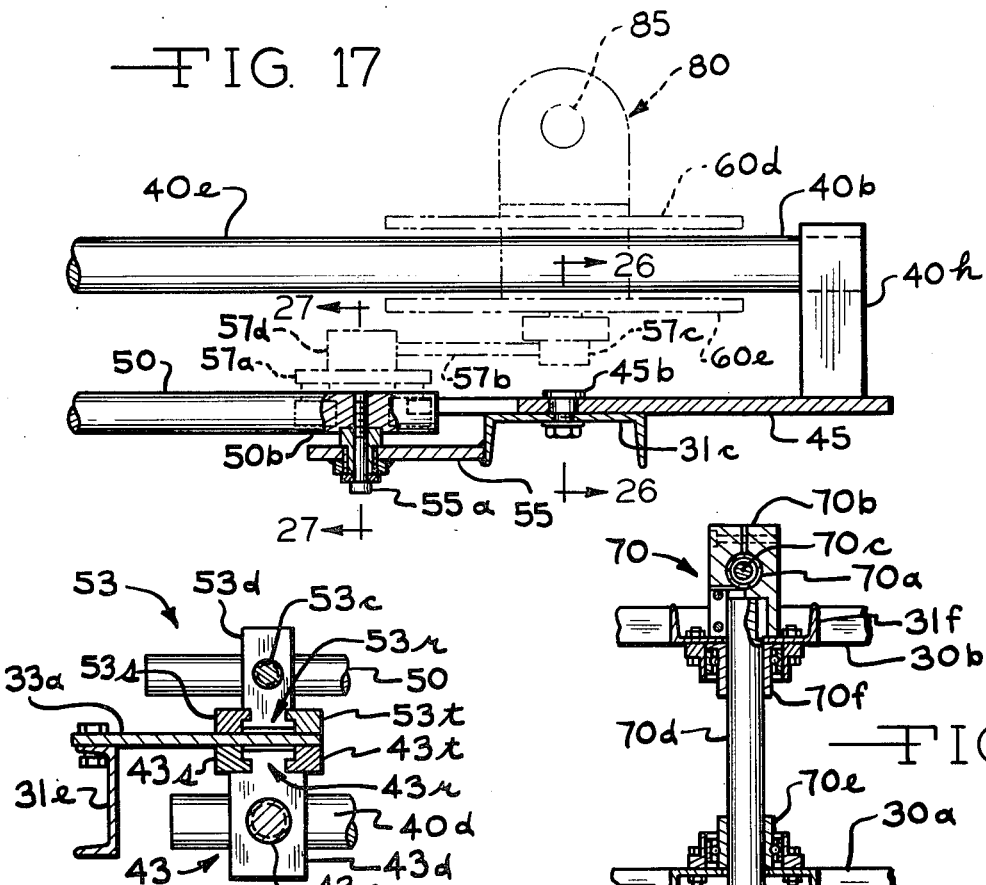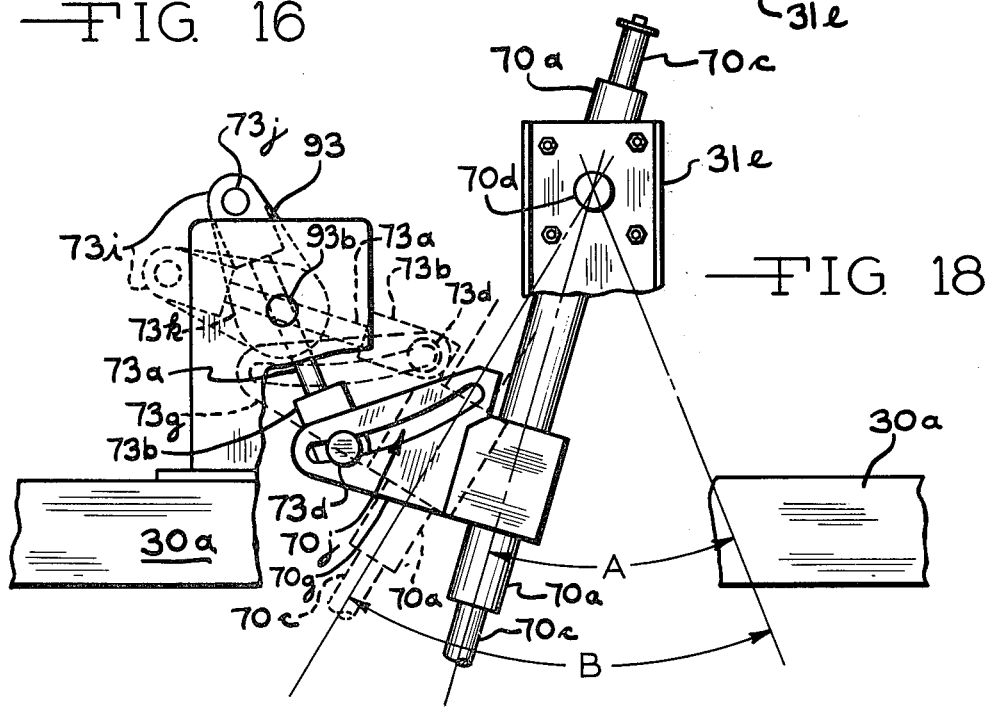

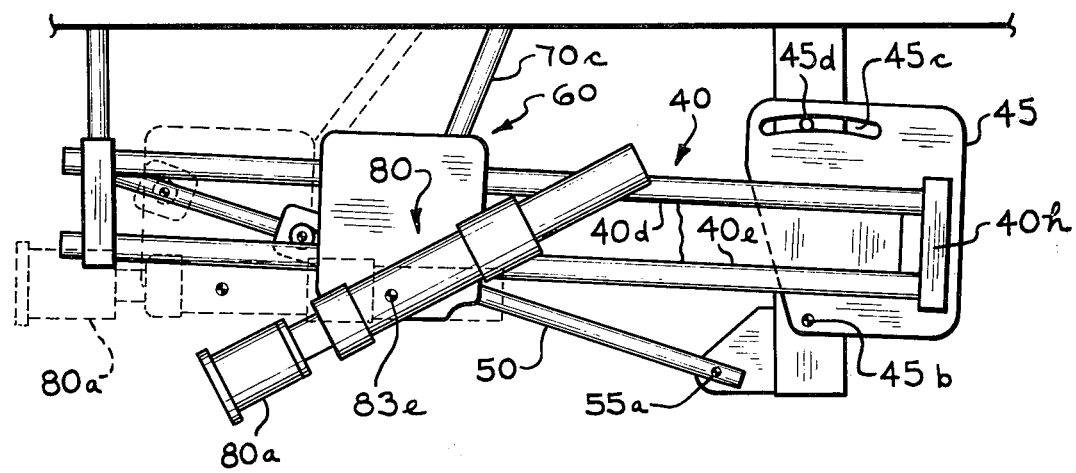
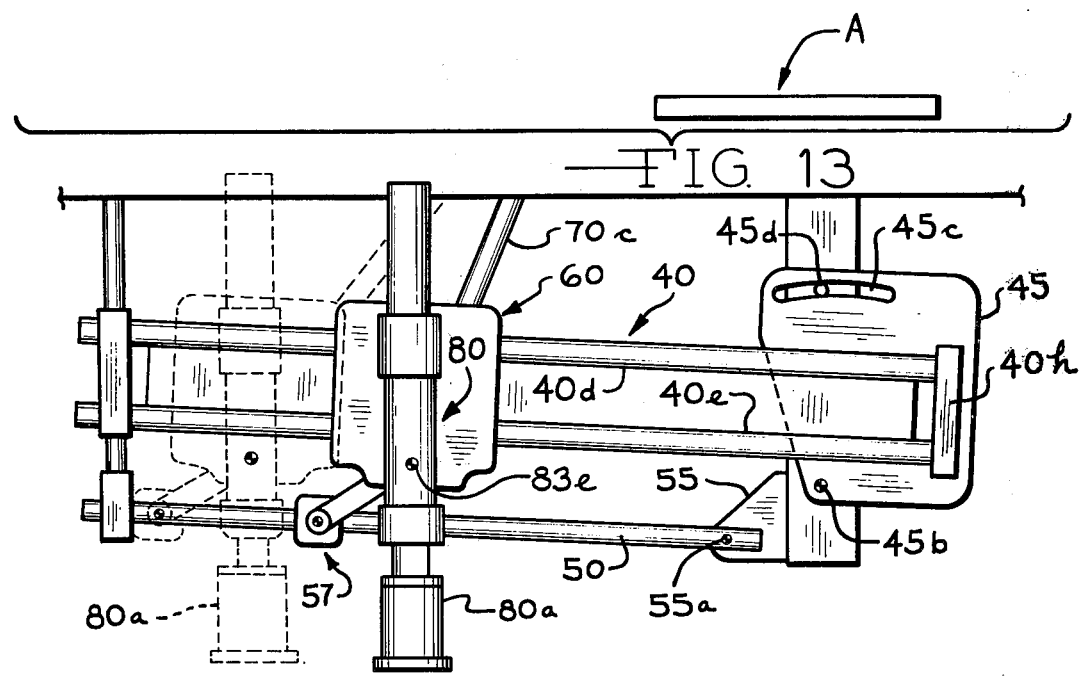
FIG. 13
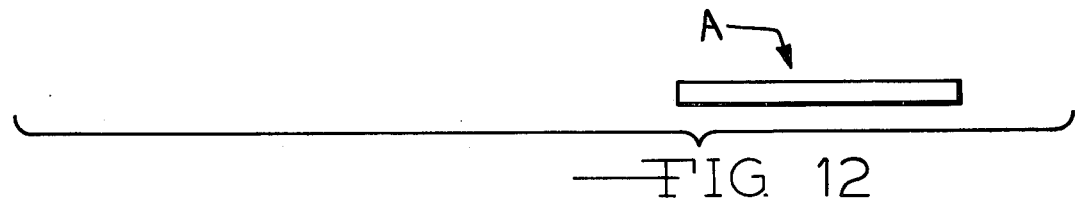
FIG. 12

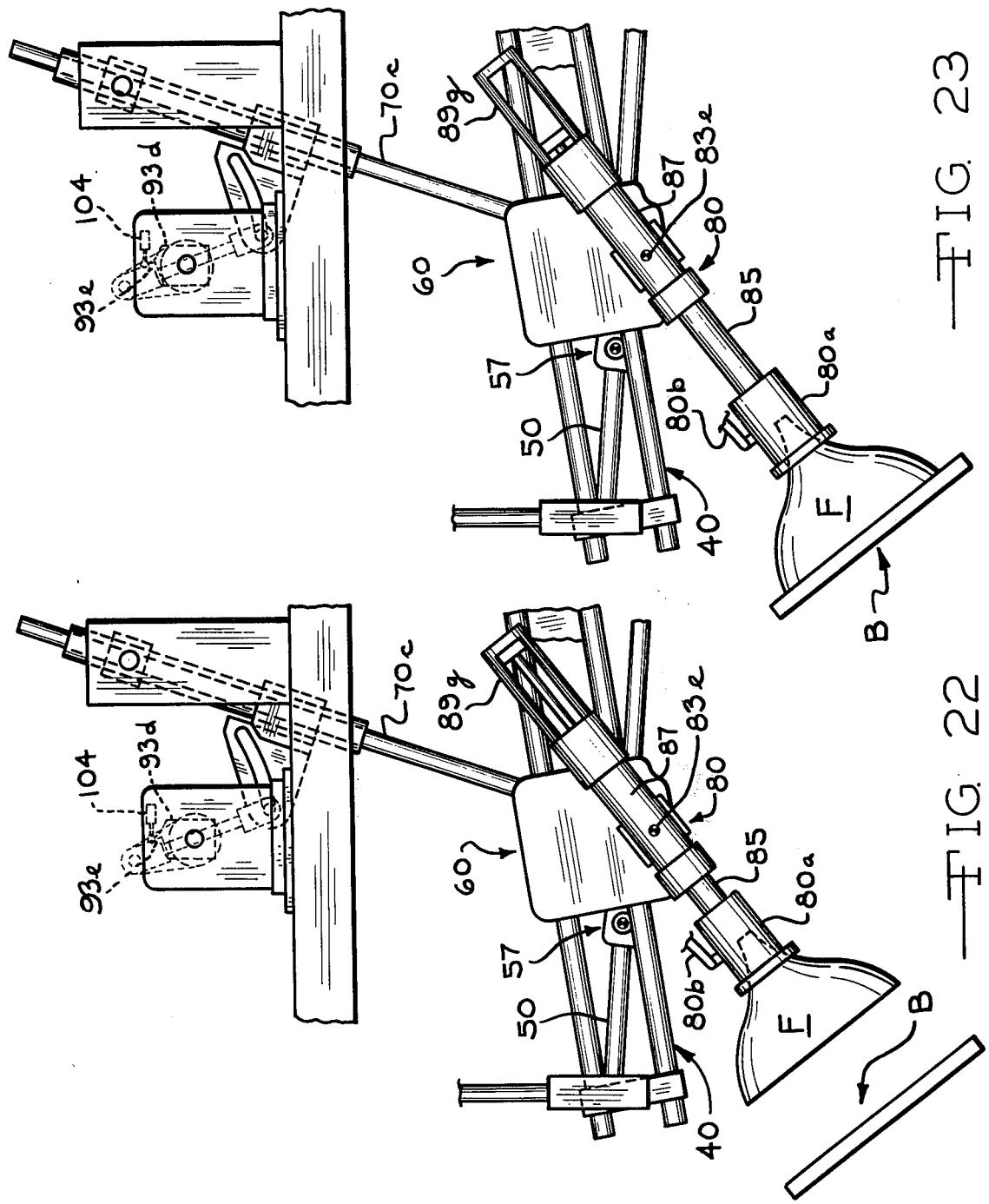

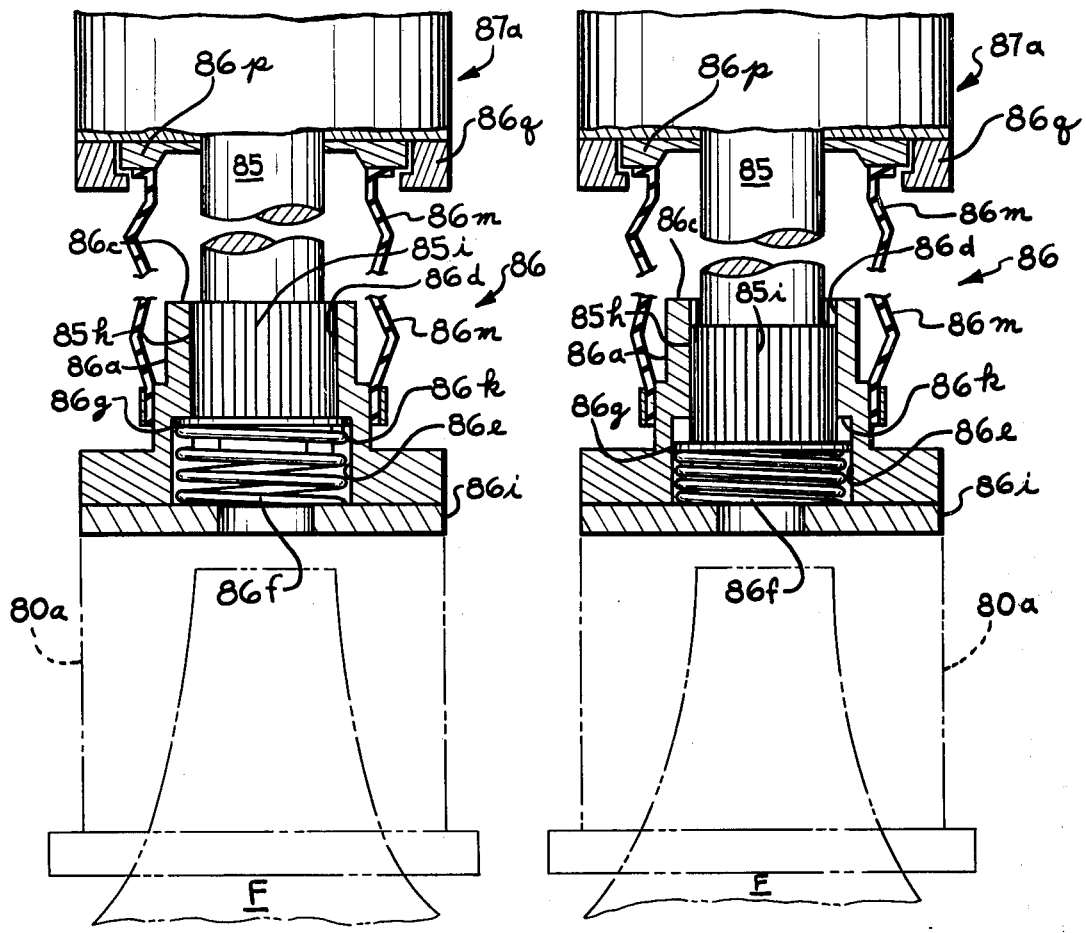
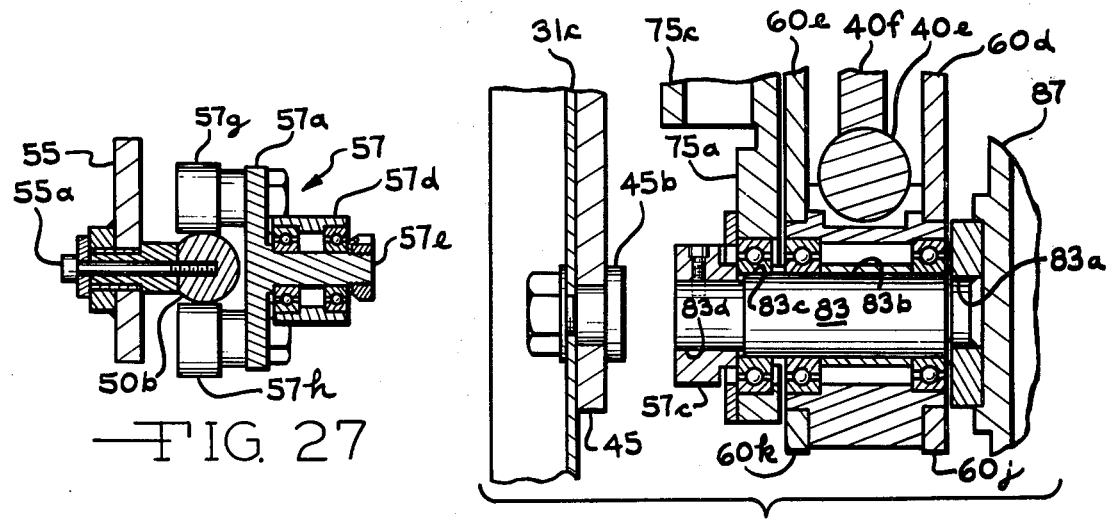

ARTICLE TRANSFER METHOD

This is a division of application Ser. No. 662,054, filed Feb. 27, 1976 now U.S. Pat. No. 4,018,342 issued Apr. 19, 1977.

BACKGROUND OF THE INVENTION

While many types of transfer devices or apparatus have been devised and employed for the transfer and transport of articles or workpieces during various manufacturing operations, none of the previously known devices or apparatus have been found to be suitable for the transport or conveyance of articles in such manner as to require that the device or apparatus possess the capabilities of the apparatus of the present invention. So far as is known in this regard, the functions of the apparatus of the present invention have been achieved previously only by manual transfer movements and positioning of the article or workpiece.

More particularly, during the manufacture of the funnel and faceplate components which form the envelope of a cathode-ray tube, such as a television tube, numerous operational and manufacturing steps are required which necessitate the transport and conveyance of both the funnel and the faceplate components to and between various different locations and work stations. While the transport and conveyance of these components have in many instances been mechanized to reduce or avoid the time and effort previously expended in manually conveying such components between various operational locations, the nature of some of the manufacturing operations have been too complicated to be readily susceptible to the utilization of automatic article transfer devices or apparatus. One exemplary operation during the manufacture of the funnel component of a cathode-ray tube is that of insertion of an anode button in the wall of the funnel component. In such an operation, it is crucial that the anode button be precisely and exactly located in the wall of the funnel component. Moreover, while different sizes and shapes of funnel components have different anode button locations, such precision of the anode button location must be maintained for each of the various and numerous types and configuration of funnel components undergoing anode button insertion. Heretofore, the precision placement and positional orientation required for such anode button insertion operations have precluded the effective employment of automated transfer apparatus capable of reliably transporting, positioning and orienting the funnel component at the anode button insertion station, and having the additional capability of providing sufficient orientational versatility to accommodate the widely varying positional and orientational requirements of the many different shapes and sizes of cathode-ray tube funnels ordinarily processed in normal manufacturing operations. Accordingly, the need for such an automated funnel transfer apparatus has, so far as is known, remained to be fulfilled by the transfer apparatus of the present invention.

SUMMARY OF THE INVENTION

The present invention pertains generally to automatically operable article transfer apparatus for transporting successive articles along an elevationally adjustable path of travel extending from one precisely located article loading station to another precisely located article unloading station and having intercooperating, selectively adjustable means for reorienting the position of each of such articles during the course of travel between such stations and to thereby deliver and deposit the articles in a precisely preselectable reoriented position at the work unloading station to which transported. The apparatus is particularly suitable for the successive transfer of articles from a precisely fixed location or work loading station to a work unloading station at which the articles must be unloaded in a precisely reoriented position dictated by the operational characteristics of equipment located to receive the articles as they are discharged at the work unloading station. In a particularly preferred embodiment, the present invention is characterized as apparatus for transferring hollow conically shaped objects such as the glass funnel components of a cathode-ray tube from a work loading station, which may be a fixed conveyor location, to a work unloading station where the next succeeding manufacturing operation requires a precise transpositional reorientation of the funnel when it is unloaded at the work unloading station. The transfer apparatus is constructed and designed for automated overhead guided transfer movements along an elevated guide track of carrier means or shuttle means from which suspended transport means carries an article gripping chuck from a pickup station, or work loading station, such as a conveyor, to a work unloading station and after which the transfer apparatus automatically returns to its initial loading position at the work loading station. The drive mechanism for transmitting forward and return movements of the carrier means along the guide track includes a motor driven crank arm acting through a pivotally mounted drive arm of adjustable stroke to shift the carrier assembly linearly along the guide track. Elevational adjustment of the carrier means at the work unloading station is afforded by a pivotal mounting of the guide track about a precisely located pivot mounting directly overlying the work loading station. Reorientation or repositioning of the article while it is being transported between stations is effected by a chuck tilt means and chuck rotation mechanism. The chuck tilt mechanism includes an elevationally adjustable tilt track running alongside of the carrier guide track and which provides guided support and pivotal movements to a tilt arm which in turn is interconnected with the chuck carrier assembly. Thus, an article such as, for example, the funnel component of a cathode-ray tube may be transported from a fixed location work loading station and thereafter deposited at a work unloading station in a precisely reoriented position such that the exact location of the wall of the funnel is brought into precise position and angular disposition required for the ensuing operational procedures, such as the insertion of an anode button in the wall of the funnel component.

Of no less significance is the interrelational aspects of the various adjustment features of the apparatus and which together cooperate to provide extensive variability of the positioning and orientation of an article, such as cathode-ray tube funnel, at the work unloading station to thereby permit the apparatus to be utilized in conjunction with various sizes and shapes of funnels. Moreover, the interrelational aspects of the adjustment features are such that the position and orientation of the transfer apparatus can be precisely adjusted or varied at the work unloading station without disturbing the position or orientation of the transfer apparatus at the work loading station.

Accordingly, it is an objective of the present invention to provide an article transfer apparatus of the type described and which is characterized by the inclusion of means for transporting articles between work loading and work unloading stations and during the course of such transport to accommodate positional reorientation of the articles.

Another objective of the present invention resides in the provision of means for automatically grasping an article at an article loading station and automatically depositing such article in a precisely reoriented position at another article unloading station.

Another objective of the present invention resides in the provision of article transfer apparatus capable of accomplishing the foregoing objectives and which is characterized by the provision of means for tilting the article about a moving, horizontally disposed and elevationally adjustable tilt axis during such transport to permit the article to be unloaded at the work unloading station while the article is deployed in a tilted position, and which is further characterized by the provision of means for precisely adjusting the extent of tilt imparted to the article during such transport.

Another objective of the present invention resides in the provision of means for transporting articles along an inclined path of travel to accommodate elevational disparities between the elevational height of the work loading station and the elevational height of the work unloading station, and which is characterized by the provision of means for precisely varying such inclinational path without effecting the positional or orientational characteristics of the transfer apparatus at the work loading station.

A further objective of the present invention is to provide an article transfer apparatus which is operable to transport an article from a work loading station to a work unloading station and during the course of such transport to rotate the article so as to present and unload the article in a different rotational orientation at the work unloading station.

Another more particular objective of the present invention is to accomplish the foregoing objectives with a transfer apparatus which is especially suitable to transfer the funnel components of a cathode-ray tube from a work loading station to a work unloading station and during such transport to reorient the funnel and present the same at the work unloading station in a reoriented position precisely situated to accommodate the next work operation without the necessity of further manual manipulation or positioning of the article prior to the performance of the next work operation.

These and other additional objectives, features and advantages of the present invention will become readily apparent to those ordinarily skilled in the art from the following detailed description taken in conjunction with the accompanying sheets of drawings.

BRIEF DESCRIPTION OF THE DRAWINGS

FIG. 2 is a slightly enlarged top plan view of the apparatus shown in FIG. 1.

FIG. 3 is an enlarged fragmentary side elevational view of the overhead drive mechanisms entrained for powered forward and return movements of the transfer apparatus between the article loading and article unloading stations.

FIG. 4 is a fragmentary end elevational view of the chuck transport means and shuttle means taken along and in the direction of sectional plane 4—4 in FIG. 1.

FIG. 5 is an enlarged fragmentary side elevational view of the chuck transport means and shuttle means and associated mechanisms.

FIG. 6 is a top plan view of the various means and associated mechanisms depicted in FIG. 5.

FIG. 8 is a sectional view taken along and in the direction of sectional plane 8—8 in FIG. 6.

FIG. 9 is a sectional view taken along and in the direction of sectional plane 9—9 in FIG. 5.

FIG. 10 is a sectional view taken along and in the direction of sectional plane 10—10 in FIG. 3.

FIG. 11 is a sectional view taken along and in the direction of sectional plane 11—11 in FIG. 3.

FIG. 12 is a schematic side elevational view of the chuck transport means and shuttle means and depicting the positioning of the transport means when the elevationally adjustable guide track and the elevationally adjustable tilt track are positionally disposed in one of various positions of adjustment.

FIG. 13 is a view similar to FIG. 12, but depicting for comparative purposes the positional reorientation of the chuck transport means which results when the tilt track is elevationally adjusted to a steeper inclination in relation to the guide track.

FIG. 16 is a sectional view taken along and in the direction of sectional plane 16—16 in FIG. 14.

FIG. 17 is a sectional view taken along and in the direction of sectional plane 17—17 in FIG. 14.

FIG. 18 is an enlarged fragmentary elevational view of a portion of the drive means for moving the chuck transport means between the work loading and unloading stations and particularly showing the drive arm and associated drive arm stroke adjustment means of the apparatus together with a representative showing of the functional effects of adjustments in the stroke of the drive arm.

FIGS. 19–23, respectively, are fragmentary side elevational views schematically depicting sequential positions of portions of the article transfer apparatus as it picks up and transports an article, such as the funnel component of a cathode-ray tube, from an article loading station to an article unloading station.

FIG. 24 is an enlarged fragmentary view in central section of the chuck transport shaft in a lowered or extended position and depicts the shaft in the position occupied at the instant of engagement with an article at the work loading station.

FIG. 25 is a view similar to FIG. 24, but for comparative purposes depicting the chuck transport shaft in a subsequent further lowered or extended position at the work loading station, and illustrating the functional aspects of the resilient lost motion means provided intermediate the chuck transport shaft and the article chuck carried thereby.

FIG. 26 is a sectional view taken along and in the direction of sectional plane 26—26 in FIG. 17, and illustrating certain coalignment features of the transfer apparatus at the location of the work loading station.

FIG. 27 is a sectional view taken along and in the direction of sectional plane 27—27 in FIG. 17, and illustrating further coalignment features of the transfer apparatus at the location of the work loading station.

DETAILED DESCRIPTION OF THE PREFERRED EMBODIMENTS OF THE INVENTION

Figure 1:
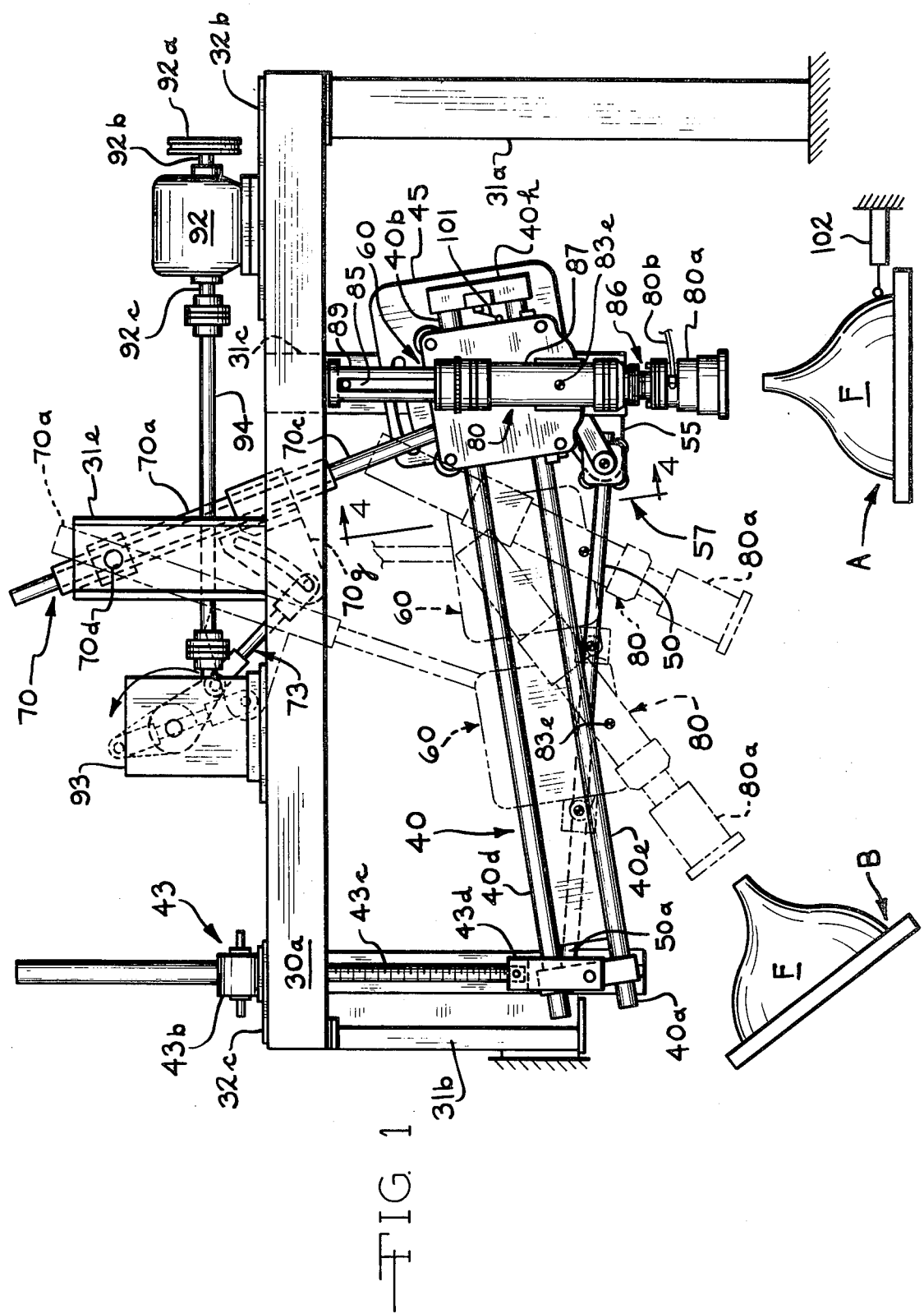
FIG. 1 is a side elevational view schematically depicting the principal mechanisms of the article transfer apparatus embodying the present invention and further portraying certain of the relative positions and locations of portions of the apparatus at the article loading station, the article unloading station and at an intermittent location between the loading and unloading stations.

Alluding initially to FIG. 1, the overall general organization and operational characteristics of the preferred embodiments of the article transfer apparatus of the present invention are schematically depicted. As depicted, the article transfer apparatus is generally shown as being operational to transfer an article, such as for example a generally conically shaped funnel component of a cathode-ray tube, designated as F, between two remotely spaced article transfer locations generally designated as A and B, and respectively constituting an article loading station and an article discharge or unloading station. While for purposes of description, the transfer apparatus of the present invention will be described as being operable to transfer an article from a horizontally disposed surface at the article loading station, such as station A, to a vertically inclined surface at article unloading station, such as station B, it will be readily apparent that the apparatus is readily convertible to reverse operation so as to transfer an article from a vertically inclined surface at station B to a horizontally disposed surface at station A.

In providing a maximization of available working space and efficiency of operations, the various mechanisms of the transfer device or apparatus are, as best observed in FIG. 2, preferably mounted, or supported, on or from overhead structural support members such as, among other, horizontal overhead beams or girders 30a, 30b, 30c and 30d, which in turn may be wall-mounted or rigidly supported in other suitable manner, such as upon upstanding support members or columns 31a and 31b or the like.

Suspended from the overhead structural support members there is an overhead carrier guide track 40 spanning the distance between an article or funnel pick-up position located directly above the article loading stations A and an article or funnel discharge position located above the article unloading station B. Inclinational adjustments of the carrier guide 40 are afforded by elevational adjustment means 43 supporting an elevationally adjustable end portion 40a thereof situated overhead of the location of the article unloading station B and which during adjustment pivots an opposite longitudinal end portion 40b thereof which is secured to a vertically disposed and pivotably adjustable track mounting plate 45.

Suspended in a location generally alongside of the carrier guide track 40 and also spanning the distance over which the article, such as funnel F, is to be transported between stations A and B, there is a tilt track 50 which cooperates with additional tilt means for axially tilting the article during transport so that the article will be unloaded while deployed in a tilted or inclined position complemental to the tilted surface upon which to deposit the article at the article unloading station B. The tilt track 50, like the carrier guide track 40, is designed to be inclinationally adjustable and for such purposes has an elevationally adjustable end portion 50a carried by elevational adjustment means 53 at a location generally above the article unloading station B and has a longitudinally opposite end portion 50b pivotally supported by a tilt track mounting bracket 55 located at a location proximately above the article loading station A.

Riding upon the carrier guide track 40 there is carrier means or shuttle means 60 which in response to actuation by pivotally oscillatable means 70 with which it is interconnected is caused to ride or shuttle forth and back along the guide track between loading and unloading stations A and B. Suspended from and riding with the shuttle means 60 there is chuck transport means 80 which, as best observed in FIG. 7, carries a fixed laterally projecting stub shaft 83, which interconnects with the shuttle means 60 and provides means for suspending the transport means 80 from the shuttle means and further interconnects the shuttle means 60 with the pivotally oscillatable means 70. The transport means 80 also includes an elongated transport shaft 85 partially housed within a lower pressurizable chamber section 87 wherein axially extendable and retractable movements are imparted to the transport shaft 85, and partially housed within an upper turret section 89 wherein axially rotary movements are imparted to the transport shaft 85.

Riding upon the tilt track 50 there is a tilt arm assembly 57 which is also locked onto the stub shaft 83 so as to accompany the shuttle means 60 and the chuck transport means 80 as they move from and to the article loading and unloading stations A and B. During such movement, the tilt arm assembly 57 is designed to tilt the transport means to an extent determined by the extent of angular disparity between the angle of inclination of the carrier guide track 40 and the angle of inclination of the tilt track 50.

In addition to the previously mentioned pivotally oscillatable drive means 70, other various drive mechanisms for actuation of the drive means 70 are suitably mounted overhead of the carrier guide track at spaced apart locations upon mounting plates such as, for example, mounting plates 32a and 32b spanning and secured to overhead structural framework members such as 30a, 30b and 30c. While it is to be understood that most of the various drive mechanisms for actuation of the pivotably oscillatable drive means 70 are conventional and susceptible to replacement or substitution by other types of drive means, a preferred arrangement of such drive mechanisms, or drive train, includes a continuous drive motor 91 suitably interconnected with a selectively actuatable clutch brake 92 by means of a gripbelt 93 entrained continuously around a variable speed sheave 91a mounted on the output drive shaft 91b of motor 91 and around a sheave 92a similarly mounted on the continuously driven input shaft 92b of the clutch brake 92. The selectively actuatable clutch brake 92 is interconnected with a speed reducer 93 and has a selectively actuatable output shaft 92c coupled to the input shaft 93a of the speed reducer 93 by means of an intermediate drive shaft extention 94. The speed reducer 93, in turn, has an output drive shaft 93b which through interconnecting linkage means and crank arm means included with the pivotably oscillatable means 70 selectively actuates the latter in timed and selectively coordinated sequence to shift the shuttle means 60, the chuck transport means 80 and the tilt arm assembly sequentially forth and back between stations A and B as previously described.

Figures 14, 15:
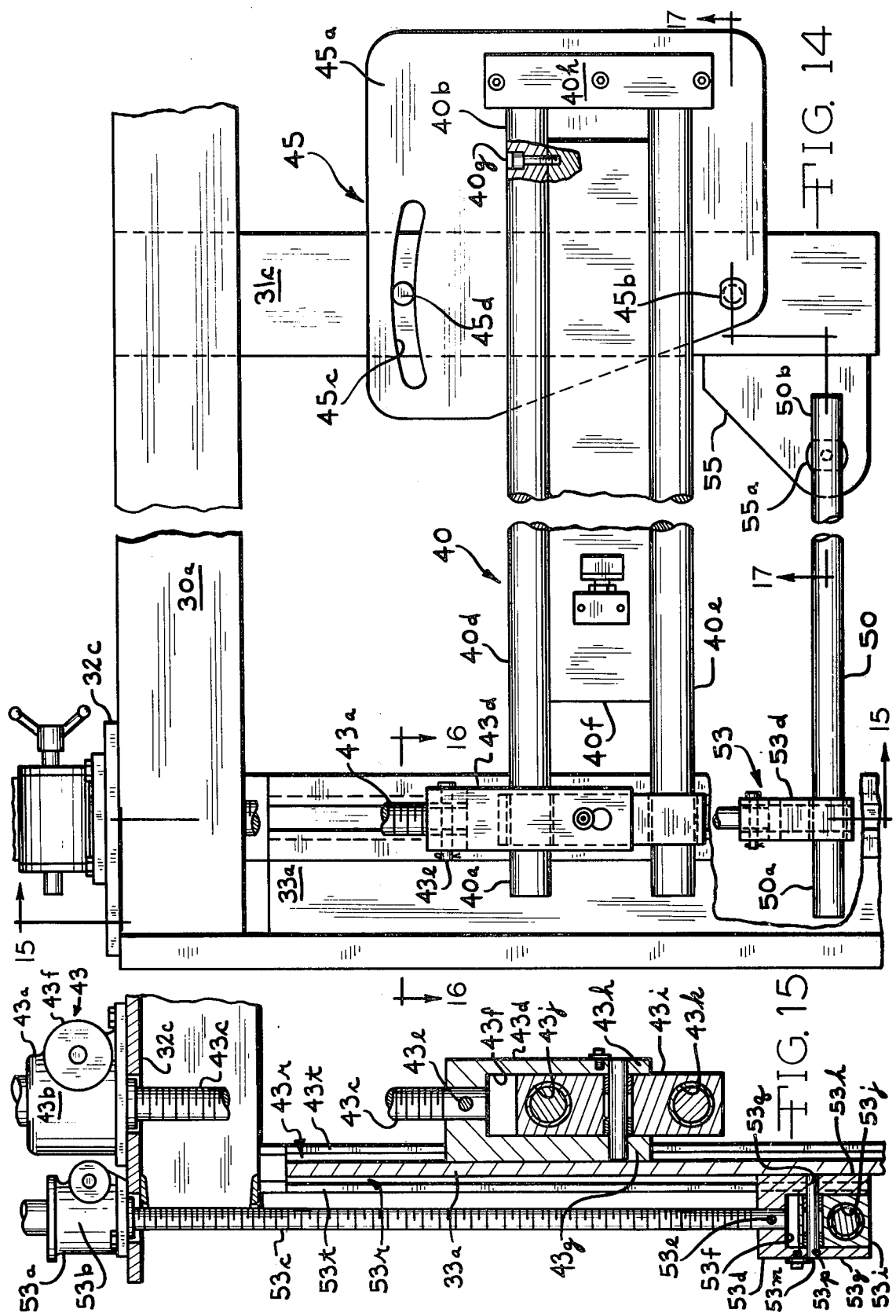
FIG. 14 is a partially fragmentary side elevational view in enlarged scale of the carrier guide track and tilt track assembly and depicting the associated elevational adjustment and mounting mechanisms therefor.
FIG. 15 is a partially fragmentary sectional view taken along and in the direction of sectional plane 15—15 in FIG. 14.

In more detailed respects, the carrier guide track 40, as best observed in FIG. 14, includes vertically interspaced, parallel upper and lower guide rails 40d and 40e, respectively, which are rigidly interconnected by an intermediate structural web member 40f extending substantially the length of the guide rails. Any suitable means of fastening the guide rails 40d and 40e rigidly to the web member 40f may be employed, such as for example, bolts 40q located at longitudinally spaced positions along the length of both guide rails 40d and 40e. The interconnection between the guide rails 40d and 40e and the adjustable track mounting plate 45 is aptly provided by means of an end rail mounting block 40h in which the axial end portions of the guide rails 40d and 40e are journalled in locked position and which in turn is rigidly bolted, or otherwise suitably secured, to the face surface 45a of the pivotally adjustable track mounting plate 45. In turn, the pivotably adjustable track mounting plate 45 is mounted for pivotable adjustment on vertical support member 31c by means of a secured pivot pin 45b disposed perpendicularly to the face surface 45a and traversing the track mounting plate 45 and the rigid vertical structural support member 31c to provide a horizontally disposed pivot axis about which to vertically pivot the plate 45 and the attached guide track 40. Preferably the track mounting plate 45 also is provided with an arcuate transverse slot at 45c which is concentric with the axis of pivot pin 45b and receiving a support pin 45d on support member 31c.

As best illustrated in FIGS. 14 and 15, the elevational means 43 for the carrier guide track 40 includes a threaded jack screw 43a which for purposes, among others, of greater accessability in the work space region in the vicinity of the work unloading station B is preferably mounted with the adjustable crank housing 43b secured in position on an overhead mounting plate, such as mounting plate 32c, which in turn may be mounted in fixed position upon overhead beams or girders such as, for example, horizontal girders 30a and 30d. The suspended lower end of the threaded shaft portion or screw portion 43c is interconnected with the elevationally adjustable end portion 40a of the carrier guide track 40 by means of a forked mounting bracket 43d secured to the lower end of the screw portion 43c by suitable means such as a clevis pin 43e, or the like, accommodating relative movement between the mounting bracket 43d and the screw portion 43c during elevational adjustments of the guide track 40. By virtue of such elevational adjustment means, the elevationally adjustable end portion 40a of the guide track 40 may be adjustably raised or lowered by the screw crank 43f on crank housing 43b, causing the carrier guide track 40 to be pivoted with the track mounting plate 45 about the horizontal pivot axis provided by the pivot pin 45b disposed above the work loading station A. As illustrated in FIG. 16, the forked mounting bracket 43d includes a bifurcate yoke section 43f with depending leg portions 43g and 43h straddling a separate end rail mounting block section, or rail spacer block 43i having parallel spaced openings therethrough as at 43j and 43k receiving and holding the elevationally adjustable end portions of each of the guide rails 40d and 40e. The rail spacer block 43i is, in turn, carried for rotatable movements between the legs 43g and 43h of the yoke section 43f by a connector pin 43m traversing a medial portion of the rail spacer block 43i and traversing each of the legs 43g and 43h.

As also best illustrated in FIGS. 14 and 15, the structural arrangement of tilt track 50 is such that the pivotally supported end portion 50b thereof is pivotally carried by the tilt track mounting bracket 55 which projects from and is secured to the side of the upstanding support member 31c at a location alongside of and underlying the carrier guide track 40. The pivotal interconnection of the tilt track 50 and the mounting bracket 55 is, as best seen in FIG. 17, afforded by the pivot pin 55a which is rotatably carried by the mounting bracket 55 and secured to the tilt track 50 to provide a horizontal pivot axis about which to pivot the tilt track 50.

The elevational adjustment means 53 for the tilt track 50, like the elevational adjustment means 43 for the carrier guide track, is also preferably a jack screw 53a and includes a crank housing 53b, mounted adjacent to the jack screw 43a upon the overhead plate 32c, and a vertically suspended screw portion 53c. Also, and in similar manner as with the interconnection between the screw portion 43a and the carrier guide track end portion 40a, the vertically depending screw portion 53c of jack screw 53a is interconnected with the elevationally adjustable end portion 50a of the tilt track 50 by means of a clevis pin 53e interconnecting screw portion 53c with forked mounting bracket 53d having a bifurcate yoke section 53f within which to accommodate a tilt rail end block 53i between legs 53g and 53h of the mounting bracket 53d. As illustrated in FIG. 15, the tilt rail block 53i is supported upon a transverse connector pin 53m extending through a transverse opening 53j in the tilt rail end block 53i and supported at each opposite axial end in axially aligned journal openings 53p and 53q in the legs 53g and 53h, respectively. As so connected, the tilt rail end block is free to turn relative to the connector pin 53m and between the legs 53g and 53h of the bifurcate yoke section 53f.

As best illustrated in FIG. 16, guide means are provided to stabilize and guide the mounting brackets 43d and 53d, respectively. As shown, the guide means functions as a vertically extending pair of guideways as at 43r and 53r arranged alongside of and parallel to each of the depending screw portions 43c and 43d of the jack screws 43a and 53a. The means defining the guideways 43r and 53r are respectively mounted on opposite faces pf a vertically extending support plate 33a which in turn may be secured to a suitable upstanding girder such as girder 31e. Additionally, the means defining each of the guideways 43r and 53r are pairs of elongated gibs and one pair, such as 43s and 43t cooperate to define guideway 43r and the other pair, such as 53s and 53t cooperate to define guideway 53r. The guideway defined between the pair of gibs 43s and 43t forms a track within which to confinably accommodate a generally T-shaped tongue 43u projecting from the side of mounting bracket 43d for vertical sliding movements of the mounting bracket 43d while restricting the mounting bracket 43d against horizontal movements. In the same manner, a generally T-shaped tongue 53u projecting from the side of the mounting bracket 53d is confined to vertical movements within the guideway at 53r defined between the pair of gibs 53s and 53t.

Figure 7:
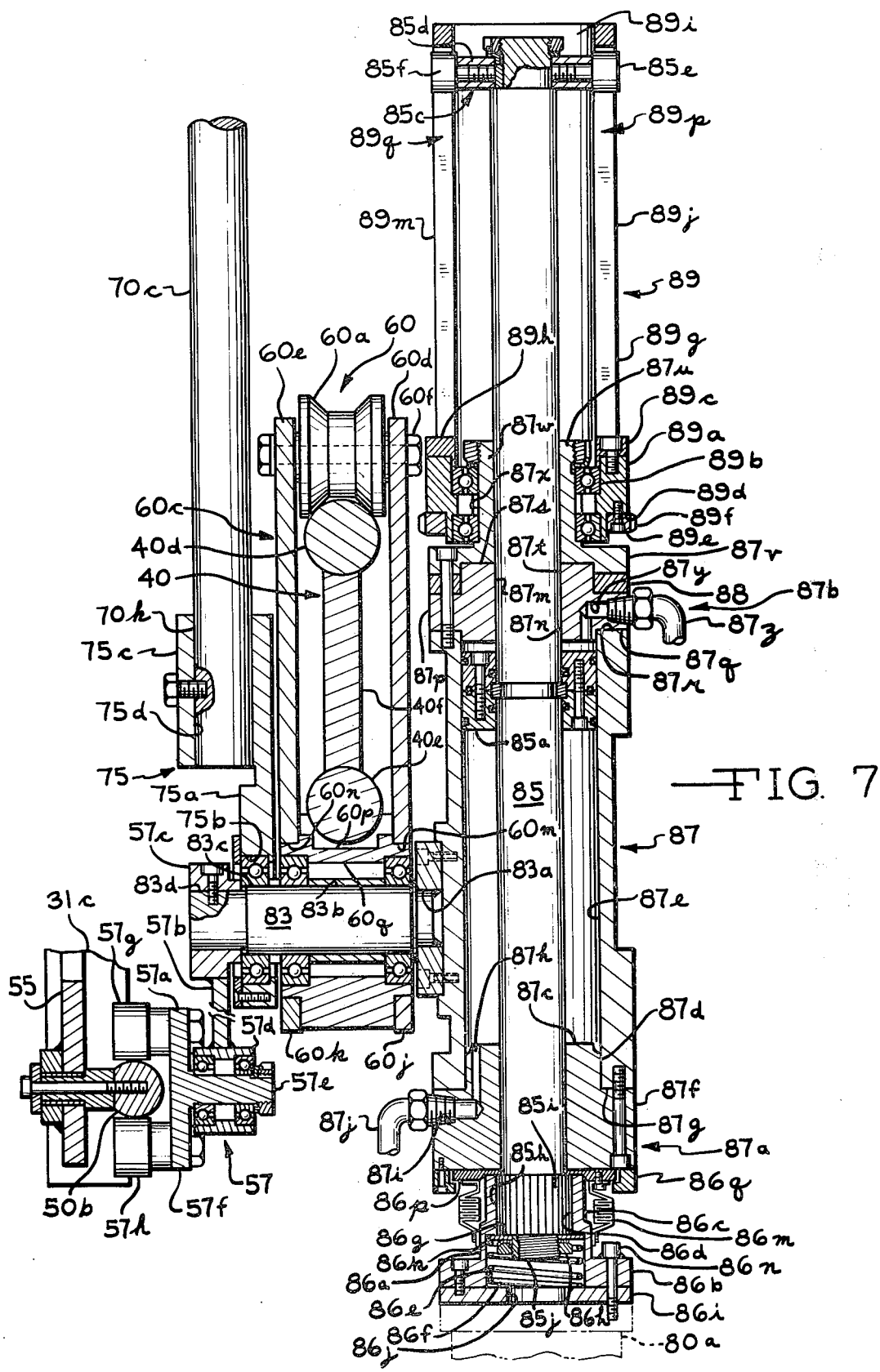
FIG. 7 is a detailed central sectional view of the chuck transport means taken along and in the direction of sectional plane 7—7 in FIG. 5.

As best observed in FIGS. 4, 5 and 7, the carrier means or shuttle means 60 is suitably designed to ride smoothly, such as upon a pair of camrollers 60a and 60b, back and forth upon the upper guide rail 40d of the guide track means 40 between the article loading and article unloading stations in response to actuation by a transferential series of intercooperating drive means or mechanisms suitably mounted upon or supported by overhead structural framework members at convenient locations elevated above and out of the path of the carrier guide track means 40 and the path of movement of articles being transferred between the article loading and article unloading stations. In more detailed respects the shuttle means 60 includes includes a carrier frame 60c comprising a pair of mutually facing interspaced side plates 60d and 60e arranged to vertically straddle the carrier guide track 40. Roller pins 60f and 60g fastened to the side plates and spanning the interspece therebetween carry the camrollers 60a and 60b and are located adjacent the leading and trailing ends of the upper edges of the side plates 60d and 60e. The roller pins 60f and 60q are, as illustrated, preferably provided with roller bearings, or the like, to enhance smooth relatively frictionless roller movement of the camrollers along the carrier guide track 40. Disposed intermediate the side plates 60d and 60e and located adjacent the leading and trailing ends thereof there is a pair of stabilizer shoes 60h and 60i which are individually bolted to the side plates 60d and 60e and arranged to frictionally slide along the underside surface of the lower carrier guide rail 40e and impart positional stability to the shuttle means 60 on the carrier guide track 40. Both of these side plates 60d and 60e also have mutually facing medial underslung sections 60j and 60k defining coaxially aligned transverse openings at 60m and 60n. As illustrated, these latter openings are vertically spaced or offset sufficiently beneath the bottom of the carrier guide track 40 to axially receive and retain a hollow bushing 60p defining an axial bore 60q housing ring bearings, or the like, within which to axially receive and rotatably accommodate the transport means stub shaft 83 at a location disposed beneath and transversely of the carrier guide track 40.

As best illustrated in FIGS. 2 and 3, the pivotably oscillatable drive means 70 is particularly designed to translate oscillatable pivot movements, or pendulum movements, to reversible linear drive movements and transmit such linear drive movements through the transport means stub shaft 83 to the shuttle means 60, the transport means 80 and the tilt arm assembly 57 to drive the same alternately forth and back between the article loading and unloading stations. The structural arrangement of the drive means 70 includes a hollow axially elongated drive sleeve 70a which is carried in depending relationship by a pivotable mounting bracket 70b providing a horizontally disposed pivot axis about which to pivotably oscillate the drive sleeve 70a. Nested coaxially within and pivotably oscillatable with the drive sleeve 70a there is an axially elongated drive rod 70c which is axially slidable within the drive sleeve 70a during pivotal movements thereof.

As also clearly shown in FIG. 11, the mounting bracket 70b is adapted to be firmly clamped around the drive sleeve 70a and is securely affixed to one axial end of a horizontally disposed shaft 70d, which, in turn, is mounted for axially rotatable movements in axially spaced pillow blocks 70e and 70f conveniently bolted to upstanding structural support members, such as support members 31f and 31g rising upwards from overhead girders such as 30a and 30b, or the like.

Means for adjustment of the extent of the pivotal or pendulum stroke of the drive means 70 is, as best viewed in FIG. 3, provided in the form of a stroke control bracket 70g having a mounting portion 70h adapted to be firmly clamped around, or otherwise securely attached, to the exterior surface of an intermediate longitudinal portion of the drive sleeve 70a. Integral with the mounting portion 70h there is a vertically disposed and radially projecting plate 70i having an arcuate stroke control slot at 70j in which to receive selectively adjustable actuator means 73 interconnecting the plate 70i with the output drive shaft 93b of the speed reducer 93. Additionally, the orientational relationship of the speed reducer output drive shaft 93b and the arcuate slot at 70j is significant, particularly with respect to the location and positioning of the transfer apparatus at the article loading station. In this latter regard, the arcuate slot at 70j is particularly designed to define an arcuate longitudinal axis which is disposed in concentrically oriented relationship with the horizontal axis of rotation of the speed reducer output drive shaft 93b when the transfer apparatus is in loading position directly over article loading station A.

The selectively adjustable actuator means 73 includes an axially elongated actuator rod or arm 73a having one axial end portion 73b provided with a transverse opening housing annular spacer bearings 73c (FIG. 10) within which to rotatably receive an adjustment pin 73d and adjustably interconnect the actuator arm 73a within the arcuate slot at 70j in the stroke control bracket 70g. As indicated in FIG. 3 by the solid and phantom line positioning of the adjustment pin 73d, the latter may be shifted to any desired location along the length of the arcuate slot at 70j and then fastened tightly to the stroke control bracket 70g at the selected location. Moreover, by virtue of the concentrically aligned disposition of the arcuate slot at 70j, such repositioning or readjustment of the actuator arm 73a and adjustment pin 73d will not affect or disturb the position or location of the pivotably oscillatable drive means 70 or the associated transfer apparatus at the article loading station A; although by such readjustments the length of stroke of the drive means 70 may be selectively altered and the unloading position of the transfer apparatus at the article unloading station B may be selectively altered.

Referring again to FIG. 10, the adjustment pin 73d is provided with axially elongated stem portion 73e, one section of which is received transversely through the arcuate slot at 70j of the stroke control bracket 70g and a succeeding section of which is arranged to ride within the annular spacer bearings 73c and a further axially projecting threaded end section 73f of which is threaded to threadably engage a threaded retaining nut 73g. The opposite axial end portion of the adjustment pin 73d is radially englarged and forms a head portion 73h of sufficiently enlarged radial extent to bar passage of the head portion 73h through the arcuate slot when the retaining nut 73g is threadably tightened on the threaded end section 73f sufficiently to securely retain the selected positioning of the actuator arm 73a within the arcuate slot in the stroke control bracket 70g.

The opposite axial end portion 73i of the actuator arm 73a, like axial end portion 73b, is also provided with a transverse opening housing annular spacer bearings, not shown, rotatably accommodating a connecting pin 73j interconnecting the actuator arm end portion 73i to one axial end portion of a crank arm 73k, as at 73m, which is provided with a transverse opening also accommodating connecting pin 73j. As shown, the opposite axial end portion 73n of the crank arm 73k is provided with a hub 73p defining a transverse opening within which the speed reducer output drive shaft 93b is received and interlocked or keyed to the hub 73p to cause the crank arm 73k to rotate with the speed reducer output drive shaft 93b. Such rotation consequently causes the crank arm 73k to rotate the interconnected end portion 73i of the actuator arm 73a through a rotational path about and concentric with the horizontal axis of rotation of the speed reducer output drive shaft 93b and, as indicated by solid and phantom lines in FIG. 1, thereby sequentially retracting and extending the actuator arm 73a during rotation of the speed reducer output drive shaft 93b. In turn such retraction and extension of the actuator arm 73a imparts consequent pivotal or pendulum-like oscillating movements through the stroke control bracket 70q to the drive sleeve 70a.

As will hereinafter become apparent, the pivotal oscillating movements of the drive sleeve 70a when transmitted to the drive rod 70c cause the latter to shift axially within the drive sleeve 70a and transmit alternate forward and reverse linear movements to the shuttle means 60, the transport means 80 and the tilt arm assembly 57. In effecting such linear movements, the drive rod 70c, as depicted in FIG. 7, has a depending end portion or drive end portion 70k interconnected with the transport means stub shaft 83 by interconnecting means 75. Such interconnecting means 75 includes a collar plate 75a arranged adjacent to the shuttle means side plate 60e and which defines a bore 75b coaxially registrable with the axial bore 60q of the hollow bushing 60p of shuttle means 60. The collar plate 75a further includes a radially extending flanged section provided with a marginal sleeve 75c defining a bore 75d having a longitudinal axis aligned perpendicularly to the axis of the bore 75b and axially receiving and securing the depending lower end portion or drive end portion 70k of the drive rod 70c therewithin. As in the manner described with respect to the bushing 60p traversing the underslung sections of the shuttle means 60, the bore 75b preferably houses ring bearings within which to axially carry and rotatably accommodate an axial section of the stub shaft 83

Turning now to a more detailed description of the transport means 80, suspension of the transport means 80 is effected by the stub shaft 83. As best shown in FIG. 7, the stub shaft 83 projects laterally outward from the exterior wall of the lower section or pressurizable chamber section 87 of the transport means 80. As illustrated, the stub shaft 83 has a longitudinal axis arranged in perpendicularly aligned relationship with the longitudinal axis of the transport shaft 85 and one axial end porton of the stub shaft 83 is mounted or otherwise securely united with the exterior wall surface of the pressurizable chamber section 87 as by means of a basal mounting flange 83a integrally provided on one axial end of the stub shaft 83 and bolted to the exterior wall of the pressurizable chamber section 87. A next outwardly succeeding axial section 83b of the stub shaft 83 is axially received within the bore 60q of the adjacent shuttle means bushing 60p wherein relative axially rotatable movements between the bushing 60p and the stub shaft 83 are accommodated. A next outwardly succeeding axial section 83c of the stub shaft 83 is axially received and rides within the bore 75b of the collar plate 75a wherein, as with the bushing 60p, relative rotatable movements between the collar plate 75a and the stub shaft 83 are accommodated. A still further outwardly extending axial section or distal end section 83d of the stub shaft 83 provides a mounting section for interlocked connection of the stub shaft 83 with the tilt arm assembly 57.

Figures 19, 20, 21:
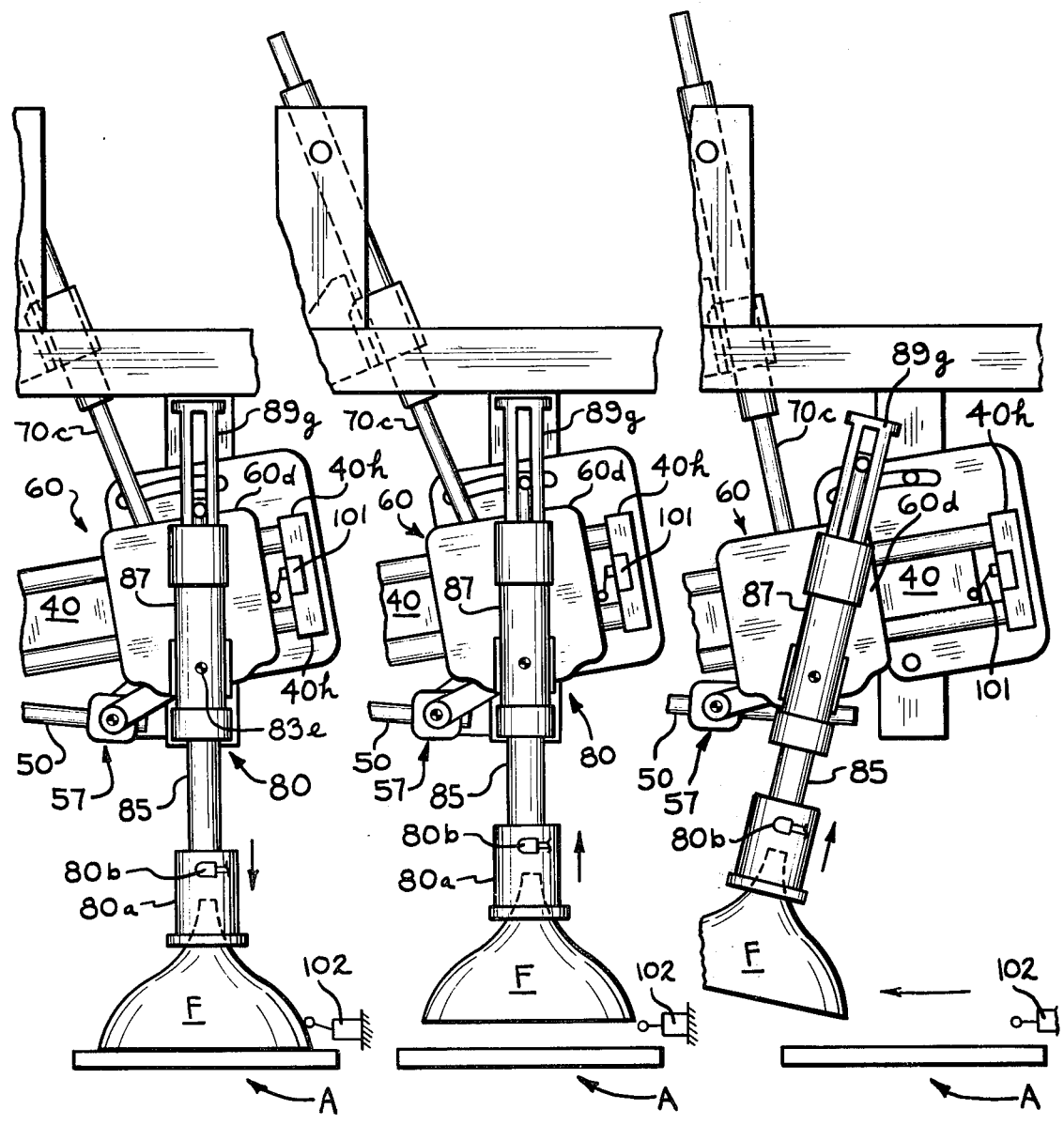

The transport means 80 is best depicted in FIGS. 5 and 7, wherein the transport shaft 85 is shown positioned in a retracted or raised relative position within the lower pressurizable chamber section 87 and the upper turret section 89, and as contrasted with the extended or lowered relative position of the transport shaft 85 schematically depicted in FIG. 19. The raising and lowering actuation of the transport shaft is effected in the lower section or pressurizable chamber section 87 of the transport means 80. As best shown in FIG. 7, the lower section or pressurizable chamber section 87 is provided with axially opposite, annular, lower and upper end assemblies 87a and 87b which enclose the opposite ends of the chamber and respectively provide a continuous fluid-tight frictional seal against the peripheral surface of the transport shaft 85, while accommodating axially longitudinal and axially rotatable movements of the transport shaft 85. In more particular respects, the lower end assembly 87a includes an annular bushing or plug 87c having a generally inverted T-shaped cross-sectional configuration defined in part by an annular stem portion 87d snugly nestable within the annular opening defined between the transport shaft 85 and the surrounding concentric interior wall surface 87e adjacent the lower axial end of the pressurizable chamber section 87, and defined in part by a radially enlarged annular head portion 87f having an underside surface adapted to seat tightly against the annular lower axial end 87g of the pressurizable chamber 87. Extending through the plug 87c there is a generally L-shaped passageway 87h extending in part longitudinally through the stem portion and diverging radially through the head portion thereof to provide a passageway communicating between the interior confines of the pressurizable chamber and an external port 87i in the head portion where the passageway is interconnected to a fluid conduit 87j. As further illustrated, the entire lower end assembly 87a is preferably held in position by suitable fastening means such as a marginally spaced array of bolts, such as at 87, passing through the marginal portions of the plug 87c and threaded into the lower axial end 87g of the pressurizable chamber 87.

The upper end assembly 87b of the pressurizable chamber 87 includes a coaxially aligned annular bushing 87m defining a generally H-shaped cross-sectional configuration with a lower annular stem portion 87n nesting snugly within the annular space defined between the transport shaft 85 and interior wall of the pressurizable chamber 87 and having a radially enlarged medial flanged section 87p having an underside surface 87q seating upon and sealing against the upper axial end 87r of the pressurizable chamber 87. Seated upon the opposite upperside surface 87s of the flanged section 87p and snugly surrounding the annular upper stem portion 87t of the bushing 87m, there is a mounting platform 88 defining a transverse opening through which to axially receive the stem portion 87t and having a radially extending section, best observed in FIG. 6, functioning as a platform upon which to mount gear drive mechanisms for imparting rotational movements to the turret section 89 of the transport means 80. Seated in turn upon the upper stem portion 87t of the bushing 87m and upon the upper surface of the mounting platform 88 marginally adjacent to the stem portion 87t there is an annular mounting hub 87u which generally defines an inverted T-shaped cross-sectional configuration with the radially enlarged portion 87v thereof, as mentioned, seated upon the mounting platform 88 and upper stem portion 87t, and with the stem portion 87w thereo extending axially outward and providing an outer peripheral surface 87x around which to support and rotatably accommodate the rotatable turret section 89 of the transport means 80. Additionally, means are provided for pressurizing or exhausting the pressurizable chamber section 87 through the upper end assembly. As shown, the annular bushing 87m defines an L-shaped passageway 87y communicating between the interior confines of the pressurizable chamber section 87 and an exterior port in which a fluid conduit 87z is connected.

Nested snugly within the confines of the pressurizable chamber section 87, and securely journalled in fixed position on and surrounding the transport shaft 85, there is an annular piston head 85a having an outer peripheral surface adapted to frictionally slide against the interior peripheral surface of the pressurizable chamber 87. Operationally, the transport shaft 85 is depicted in FIG. 7 in a fully retracted or raised position such as it is caused to occupy following pressurization of the pressurizable chamber section 87 by the application of fluid pressure from fluid conduit 87j through passageway 87h and concurrent exhaustion of pressure through passageway 87y and fluid conduit 87z. Reversal of such pressurization and exhaustion procedures by pressurization through passageway 87y and fluid conduit 87z together with concurrent exhaustion through passageway 87h and fluid conduit 87j will, of course, cause the piston head 85a to shift axially downward and extend or lower the transport shaft 85 to the fully extended position schematically shown in FIG. 19. The pressurization source for pressurization of the pressurizable chamber section 87 may be either a pneumatic or hydraulic source. Also, although not shown, the fluid pressure conduits 87j and 87z are respectively connected through suitable and conventional valves to permit each to serve alternatively as a pressurization conduit or exhaust conduit.

The upper section or rotatable turret section 89 of the transport means 80 functions to impart preselectable axially rotatable movements to the transport shaft 85 in timed coordinated relationship with other positioning or orienting movements thereof. Such rotatable movements permit selective rotational reorientation of the transport shaft 85 during transit of the transfer apparatus between loading and unloading stations A and B. Structurally, the turret section 89 includes an annular orienter hub 89a surrounding the mounting hub stem portion 87w and housing spacer bearings 89b nested concentrically around the outer peripheral surface 87x of the annular mounting hub stem portion 87w, which, in turn, has an inner peripheral surface accommodating sliding frictional contact with the transport shaft 85. The orienter hub has mounting end portions at the axially opposite upper axial end 89c and lower axial end 89d thereof. Secured to the lower axial end 89d of the orienter hub and in coaxial alignment therewith, there is an annular orienter gear 89e provided with a peripheral array of gear teeth 89f.

Seated upon and extending axially upwards from the upper axial end 89c of the orienter hub 89a there is an axially elongated cage or turret 89g having axially interspaced annular lower and upper end collar plates 89h and 89i at the lower and upper respective axial ends thereof which are arranged in radially spaced, concentrically aligned relationship with the longitudinal axis of the transport shaft 85. The lower end collar plate 89h, or base plate, is firmly seated upon and securely fastened to the upper axial end 89c of the oriented hub 89a, and as thus fastened together both the orienter hub 89a and the lower collar plate 89h share concentric, coaxial relationship with respect to the longitudinal axis of the transport shaft 85. As best observed in FIGS. 7 and 9, the lower and upper end collar plates 89h and 89l are interconnected by an interspaced spaced array of elongated guide posts 89j, 89k, 89m and 89n arranged in parallel and radially interspaced relationship with the transport shaft 85 and in perpendicular relationship with the collar plates 89h and 89i to which the guide posts are securely interconnected. As illustrated, the guide posts are mutually interspaced in such manner as to define a pair of diametrically opposite guide slots, at 89p and 89q paralleling the longitudinal axis of the transport shaft 85 and extending between the lower and upper end collar plates 89h and 89i.

In cooperation with the longitudinal axis of the transport 89p and 89q, the transport shaft 85 is provided with radially extending guides means 85c arranged to travel within and lengthwise of the guide slots 89p and 89q while accompanying the transport shaft 85 during axial movements of the latter between its alternative raised and lowered axial positions. Additionally the guide means 85c are adapted to transmit rotational movements to the transport shaft in response to axial rotational movements of the turret 89q and accompanying axial rotational movements of its associated guide posts 89j, 89k, 89m and 89n and guide slots 89p and 89q. As best viewed in FIGS. 7 and 9, the guide means 85c preferably includes a support member, such as a support plate 85d firmly secured to the upper axial end, or in proximity to the upper axial end, of the transport shaft 85 and carrying oppositely disposed guide members, such as camrollers 85e and 85f, extending radially outward therefrom and with respect to the transport shaft 85 and respectively arranged to ride within the guide slots 89p and 89q.

The lower axial end section of the transport shaft 85, designated as 85h, is designed to project axially outward from the lower end assembly 87a of the pressurizable chamber section 87 even when the transport shaft 85 is retracted to its raised position shown in FIG. 7. As shown, the lower axial end section 85h of the transport shaft 85 is adapted to interconnect with the article chuck 81 through resilient lost-motion interconnecting means 86. As thus adapted, the lower axial end section 85h includes a diametrically enlarged and longitudinally splined peripheral surface portion 85i axially adjacent to a reduced diameter threaded terminal end portion 85j. Carried on the lower axial end section 85h and intercooperating therewith to provide the resilient lost-motion interconnection there is an annular adapter 86a defining a generally inverted T-shaped cross-sectional configuration and comprising an annular radially enlarged, flanged end portion 86b and a reduced diameter upper end portion or stem portion 86c provided with a longitudinally splined interior bore 86d complementarily interengaging the splined surface portion 85i of the transport shaft 85 and accommodating longitudinal intersplined relative movement between the adapter 86a and the lower axial end section 85h of the transport shaft 85. Also defined within the adapter 86a and coaxially communicating with the splined bore 86d thereof, there is an axially enlarged counterbore 86e extending axially through the lower axial end 86b and housing a resilient coil spring 86f, and axially receiving the reduced diameter threaded end portion 85j of the transport shaft 80. Carried concentrically on the threaded end portion 85j there is an annular stop washer 86g which is suitably retained by means of a fastener such as a lock-nut 86h threadably attached on the threaded end portion 85j. As will be observed, the stop washer 86g is diametrically larger than the splined interior bore 86d, but diametrically smaller than the enlarged counterbore 86e wherein it is housed and urged against an interior peripheral shoulder 86k formed at the confluence of the enlarged counterbore 86e and the smaller splined interior bore 86d. Attached to the end surface of the flanged end portion there is a coaxially aligned annular retaining plate 86i confining the resilient coil spring 86f within the counterbore 86e and having a central transverse opening at 86j of smaller diameter than the counterbore 86e, but of larger diameter than the threaded end portion 85j of the transport shaft 85. As thus constructed, axial relative movement of the transport shaft 85 into the adapter 86a is resiliently resisted by the coil spring 86f to provide a resilient lost-motion interconnection between the transport shaft 85 and the adapter 86a. The flanged end portion 86b of the adapter 86a also is provided with suitable fastening means such as bolts 86n, or the like, for interconnection of the adapter 86a with the retaining plate 86i and with the article carrying chuck 81. Preferably, surrounding and isolating the resilient lost-motion interconnecting means 86 and the projecting lower axial end section 85h of the transport shaft 85 from exposure to damage by air borne dirt particles, or the like, there is a flexible sleeve or bellows 86m which is sufficiently flexible to axially extend and retract through out the extent of axial movement of the transport shaft between its lowered, extended position and its raised retracted position. As shown, one axial end portion of the bellows 86m is fastened to a ring 86p concentrically surrounding the projecting lower axial end section 85h of the transport shaft 85 and which is freely suspended and rotatable within a marginal rim 86q fastened to the lower axial end of the pressurizable chamber lower end assembly 87a so that the ring 86p is free to rotate in accompaniment with the transport shaft 85 and the annular adapter 86a, around the outer peripheral surface of which, and to which, the opposite axial end portion of the bellows 86m is fastened. Thus, both the projecting lower axial end section 85h of the transport shaft 85 and the resilient lost-motion interconnecting means 86 may be protectively isolated during raising and lowering of the transport shaft 85.

The tilt arm assembly 57, as previously mentioned, rides on the tilt track 50 and functions to tilt the transport means 80 a selectively adjustable extent about the longitudinal axis of the stub shaft 83 as the transport means 80 is shifted between the article loading and unloading stations A and B. This functional aspect of the tilt arm assembly 57 is clearly depicted in FIG. 1 wherein the transport means is shown in solid lines in vertical or upright position at its loading position above the article loading station A, and for purposes of comparison is shown in phantom lines in two tilted positions corresponding to two successively advanced locations along its path of travel as it is moved to the article unloading station B. As best observed by a comparative observation of FIGS. 12 and 13, the extent of the tilting movement is determined by the difference between the angle of inclination of the tilt track 50 and the angle of inclination of the carrier guide track 40; the inclination of each of which is, as previously described, selectively adjustable by means of elevational adjustment means 53 and 43, respectively. For example, as shown in FIG. 12, the tilt track 50 and the carrier guide track 40 are disposed in parallel relationship, and, although both are slightly inclined, there is no difference between the angle of inclination of the tilt track 50 and that of the carrier guide track 40. Consequently, the tilt arm assembly 57 does not cause the transport means 80 to assume a tilted position during movement between the work loading and work unloading stations A and B. By way of contrast, however, in FIG. 13, the angle of inclination of the tilt track 50 is much greater than the angle of inclination of the carrier guide track 40. As a result of such difference in the respective angles of inclination, the tilt arm assembly 57 has caused the transport means 80 to be gradually tilted from a vertical position corresponding to its loading position, as in FIG. 1, at a location above the article loading station A to a tilted transitional position, shown in solid lines, intermediate stations A and B and finally to an extreme horizontal position, shown in phantom lines.

Structurally, the tilt arm assembly 57, as best observed in FIGS. 5 and 7, includes a tilt track follower unit 57a which is designed to ride upon and be guided along the elevationally adjustable tilt track 50, and a tilt arm 57b carrying integral mounting hubs 57c and 57d at opposite longitudinal ends thereof defining mutually parallel central bores disposed transversely of the tilt arm. One of such hubs 57c is journalled on and interlocked with the distal end section 83d of the stub shaft 83 while the other hub 57d houses ring bearings within which to rotatably accommodate a spindle shaft 57e laterally projecting from and integrally affixed to one face of a vertically disposed camroller mounting plate 57f. The camroller mounting plate 57f, in turn, is located adjacent to the tilt track 50 and on the face opposite the spindle shaft 57e carries laterally offset upper and lower camrollers 57g and 57h (a pair of upper and a pair of lower camrollers being shown in FIG. 5) designed to peripherally roll along and be guided by the tilt track 50 in a linear path of movement having a vertical plane adjacent to and paralleling the vertical plane of the linear path of movement afforded to the shuttle means 60 by the carrier guide track 40.

The drive mechanisms for imparting rotational movements to the turret section 89 of the transport means 80 are optionally operable, as well as selectively adjustable to impart only the desired extent of rotation to the turret section 89, and through the turret section and transport shaft 85 to the article chuck. As best shown in FIGS. 6 and 8, such drive mechanisms include a rotary actuator unit 88a mounted on the mounting platform 88 and which is selectively actuatable to rotate the previously described orienter gear 89e carried on the orienter hub 89a of the turret section 89. The rotary actuator unit 88a may be any suitable rotary actuator such as, for example, a conventional ROTAC actuator provided with selectively adjustable limit stops which selectively limit or control the extent of rotation to that desired or selected. As shown, the rotary actuator unit 88a includes a selectively operable motor or drive unit with limit stops enclosed within housing 88b, and driving a rotatable drive shaft 88c operatively interconnected through a suitable adapter 88d to an actuator gear 88e, such as a peripherally toothed spur gear, or the like, which is selectively rotatable in response to selective operation of the drive unit in housing 88b. The actuator gear 88e, in turn, is intergeared with the peripheral gear teeth 89f of the orienter gear 89e. Optionally, an idler gear 88f may, if desired, be entrained between the actuator gear 88e and the orienter gear 89e and, as shown, be suitably mounted upon the mounting platform 88.

MODE OF OPERATION

Figure 28:
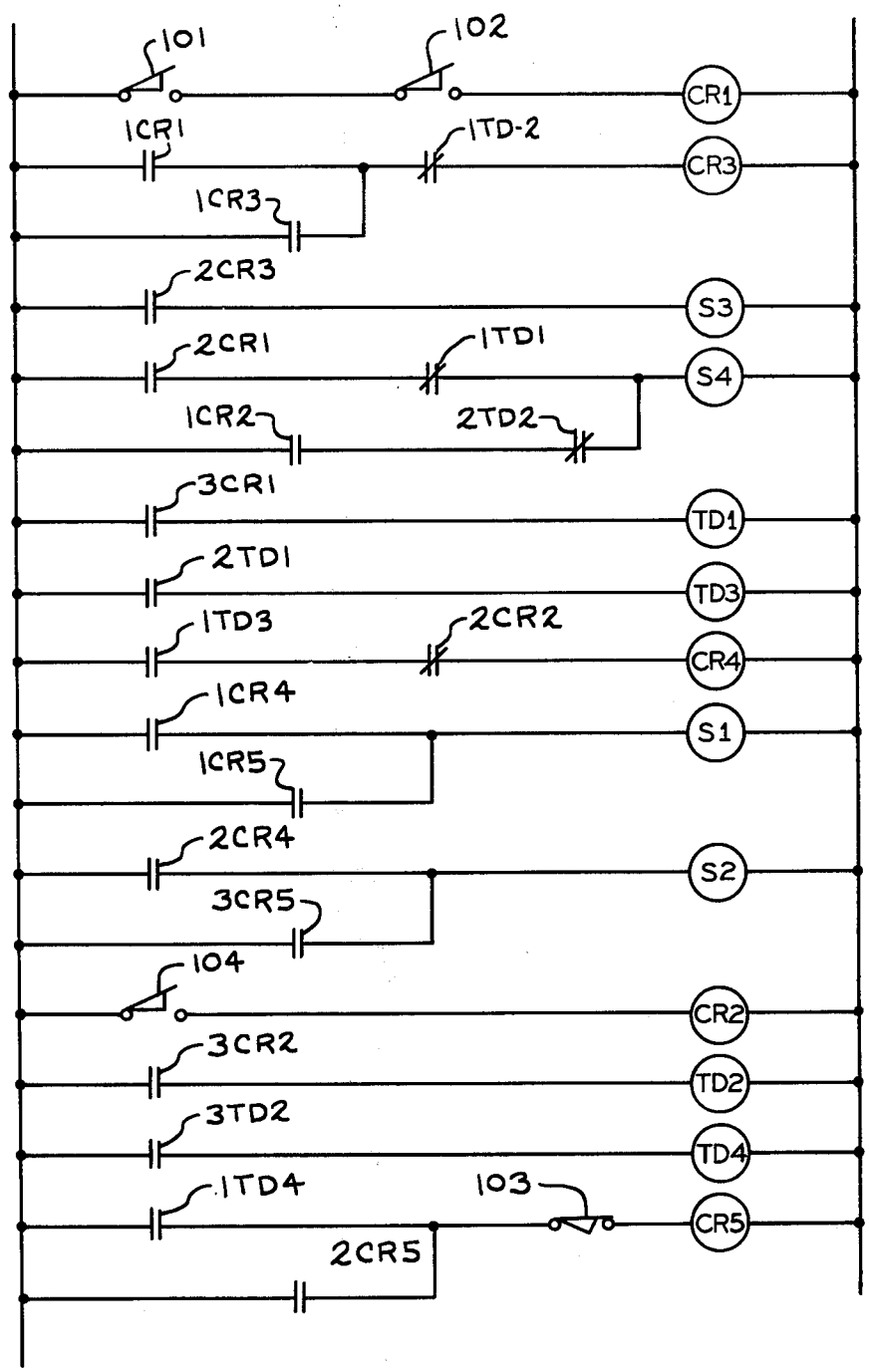
FIG. 28 is a schematic diagram of a control system for operational sequential control of the transfer apparatus.

The sequence of successive transfer operations between the article loading and unloading sections A and B is schematically depicted in FIGS. 19—23, and such sequence will be described in conjunction with the schematic control program shown in FIG. 28. For purposes of description, the cycle of operation will be described as commencing with the return arrival of the transport means 80 at its loading position directly above the article loading station A, such as would occur following return of the transport means 80 from the article unloading station B. Upon arrival at its loading position a pair of limit switches designated as 101, shown in FIGS. 19—21, and 103, shown in FIGS. 2 and 3, are contacted and such contact causes normally closed limit switch 103 to be opened and deactivated and normally open limit switch 101 to be closed and activated. These limit switches may, of course, be placed in any suitable location where their activation or deactivation is coordinated with the arrival of the transport means at its desired loading position directly above article loading station A. Among others, a suitable position for normally open limit switch 101 (FIG. 28) is shown in FIGS. 19-21 as being attached to the carrier guide track end rail mounting block 40h, so as to be contacted and closed by the shuttle means 60 upon arrival at the loading position. A suitable position for normally closed limit switch 103 (FIG. 28) is shown in FIGS. 2 and 3 as being adjacent to the rearward projecting end portion 93c of the speed reducer output shaft 93b and in position to be contacted and deactivated by a cooperating switch plate 93d which rotates with the shaft end portion 93c. As shown, a peripheral tab 93e on the switch plate 93d is adapted to contact and open normally closed limit switch 103 once during each revolution of the ouput shaft 93c; such point of contact and opening of the limit switch 103 being coordinated to correspond to the arrival of the transport means 80 at its article loading station A upon completion of each successive article transfer and return cycle, since each full revolution, or 360° rotation, of the output shaft 93c corresponds to a complete forward and return stroke of the pivotally oscillatable drive means 73 and accompanying forward and return movements of the transport means 80 to and from the article unloading station B. Also, the opening of the limit switch 103 is coordinated to occur when the drive arm 73a and the crank arm 73k arrive at bottom dead center position, since the article loading position of the transport means 80 is also coordinated to correspond to the lower dead center position of the drive arm 73a and the crank arm 73k where, as best observed in FIG. 18, the drive arm 73a and the crank arm 73k are at their maximum downward extended position and the longitudinal axis of the drive arm 73a is disposed in radially aligned relationship with the axis of rotation of the speed reducer output drive shaft 93b.

Contact of the switch plate tab 93d with normally closed limit switch 103 causes limit switch 103 to open. As observed at the bottom of FIG. 28, the opening of limit switch 103 interrupts the energization of control relay CR 5 and causes it to open along with paired normally open control relays 1 CR 5 and 2 CR 5 which are also deenergized by the opening of control relay CR 5. The deenergization of control relay contact pair 1 CR 5, in turn, deenergizes solenoid S1 and causes clutch brake 92 to disengage from continuous motor 91 and terminate the operation of speed reducer 93 and the interconnected selectively adjustable actuator means 73 and pivotally oscillatable means 70, to thereby cause the shuttle means 60 and transport means 80 to come to rest in loading position directly above article loading station A and with the drive arm 73a and crank and 73k in bottom dead center position.

The closing of normally open limit switch 101 by virtue of its contact with the shuttle means 60 upon arrival of the shuttle means 60 and transport means 80 at the article loading position, as shown in FIG. 19, is ineffective to commence the next loading and transfer cycle unless normally open limit switch 102, which senses the presence of an article in pick-up position at the article loading station A, is closed by virtue of being contacted by an article in pick-up position at the article loading station A. The presence of the transport means at the article loading position and the presence of an article, such as funnel F, in pick-up position at the article loading station A, fulfill the conditions for closing both the limit switches 101 and 102, and, as shown in FIG. 28, when so closed cause control relay CR 1 to be energized. Energization of control relay CR 1, in turn, simultaneously closes and energizes normally open control relay contact pairs 1 CR 1, 2 CR 1 and 3 CR 1. Control relay contact pair 1 CR 1 then energizes through normally closed timer delay contact pair 1 TD 2, control relay CR 3 which then becomes locked in closed energized position by control relay contact pair 1 CR 3 which being in parallel with contact pair 1 CR 1 is also energized and closed by the energizing of control relay CR 3. Being thus locked in control relay CR 3 will be unaffected by the subsequent reopening of limit switch 102 and/or 101, and consequent deactivation of control relay CR 1, caused by the subsequent removal of an article from article loading station A and the subsequent movement of the shuttle means 60 towards the article unloading station B. Also, through the activation of control relay CR 3 the normally open control relay contact pair 2 CR 3 is closed and energized at this time and, in turn, energizes solenoid valve S3 which controls the vacuum source to vacuum line 80b leading to the article chuck 80a. Energization of solenoid valve S3 causes it to open and commence vacuumization of the article chuck 80a.

Concurrently with the energization of control relay contact pairs 1 CR 1, 1 CR 3 and 2 CR 3, which commences and continues the vacuum exhaustion of article chuck 80a, control relay contact pairs 2 CR 1 and 3 CR 1 are also energized. The energizing of control relay contact pair 2 CR 1 acting through normally closed timer delay contact pair 1 TD 1 energizes solenoid valve S4 which controls the pressurization and exhaustion of the pressurizable chamber section 87 through upper and lower fluid pressure conduits 87z and 87j, respectively. Solenoid valve S4 is, as here, preferably a four-way valve which when deenergized functions to admit pressurized fluid through lower fluid pressure conduit 87j and exhaust pressurized fluid through upper fluid pressure conduit 87z and which when energized functions in reverse manner to admit pressurized fluid through upper fluid pressure conduit 87z and exhaust fluid pressure through lower fluid pressure conduit 87j. Thus, when energized by control relay contact pair 2 CR 1 acting through normally closed timer delay contact pair 1 TD 1, solenoid valve S4 causes upper fluid pressure conduit 87z to admit fluid pressure into the upper region of pressurizable chamber section 87 while lower fluid pressure conduit 87j is concurrently caused to be opened to exhaust fluid pressure from the lower region of pressurizable chamber section 87. Consequently, the piston head 85a is pushed downward and the transport shaft 85 is caused to be extended or lowered to bring the article chuck 80a into engagement with the article, or funnel F, as schematically shown in FIG. 19. During the extension or lowering of the transport shaft 85 the bellows 86m, although not shown in FIG. 19, extends along with the transport shaft 85, and the resilient lost-motion interconnecting means 86 to protectively isolate the extending lower section of the transport shaft 85, which would otherwise be exposed to damage and dirt particles carried in the ambient atmosphere. The extension of the transport shaft slightly exceeds that necessary to bring the article chuck 80a into snug engagement with the article, or funnel F, at the work loading station. The extent of override, or excess extension of the transport shaft 85 is accommodated by the previously described resilient lost-motion interconnecting means 86, which at the moment of engagement of the article chuck 80a with the surface of the article, or funnel F, occupy the relative positions indicated in FIG. 24, and which upon termination of the overriding extension of the transport shaft 85 occupy the relative positions indicated in FIG. 25. As will appear from a comparative observation of FIGS. 24 and 25, engagement of the article chuck 80a with the article will cause the interiorly splined adaptor 86a to remain stationary and accomodate limited further axial intersplined travel of the transport shaft 85 within the adaptor 86a while at the same time causing the stop washer on the threaded end portion 85j to be biased against and compress the resilient coil spring 86f housed with the enlarged counterbore 86e in the adaptor 86a. Thus, the resilient interconnecting means provides for limited variations in the height of the article at the article loading station A and also cushions the impact of the article chuck 80a upon the article while assuring firm engagement therebetween necessary for proper chucking of the article in the article chuck, and especially necessary when a vacuum-type article chuck is employed.

Thereafter, after alloting sufficient dwell time to fully vacuumize the article chuck 80a while in snug engagement with the article, or funnel F, the timer delay TD 1 which was activated by the closing of normally open control relay contact pair 3 CR 1 at the same time control relay contact pair 2 CR 1 activated solenoid valve S4, is caused to time out and in turn open normally closed timer delay contact pair 1 TD 1 and thereby deenergize solenoid valve S4; the deenergization of which produces a reversal of operation of the fluid pressure and exhaust systems leading to fluid pressure conduits 87j and 87z. Such reversal causes fluid pressure to be admitted through fluid pressure conduit 87j to the lower confines of the pressurizable chamber section 87 and fluid pressure to be exhausted through fluid pressure conduit 87z from the upper confines thereof. As a result, the piston head 85a is caused to move upwardly within the pressurizable chamber section 87 and, as indicated in FIG. 20, retract, or raise, the transport shaft 85 and the article chuck 85a together with the article, or funnel F, carried by the article chuck 85a.

Again referring to FIG. 28, the previously mentioned timing out of timer delay TD 1 also functions to close normally open timer delay contact pair 2 TD 1 and activate timer delay TD 3 which then closes the normally open timer delay contact pair 1 TD 3. The timer delay contact pair 1 TD 3 in turn energizes control relay CR 4 through normally closed control relay contact pair 2 CR 2, and control relay CR 4 in turn closes and energizes control relay pair 1 CR 4 and activates solenoid valve S1 which controls the operation of the clutch brake 92. When energized solenoid valve S1 causes the continuously driven clutch brake input shaft 92b to engage the clutch brake output shaft 92c and commence operation of the speed reducer 93 and attendant forward drive movements of the actuator means 73 and pivotably oscillatable means 70, thereby causing the shuttle means 60, transport means 80 and tilt arm assembly 57 to move together along the carrier guide track 40 and tilt track 50 towards the article unloading station B. The time delay stand of timer delay TD 3 may be coordinated to engage the clutch brake 92 at any desired time interval after commencement of the retraction of the transport shaft 85 and attendant removal of the article from the surface of the article loading station A. For purposes of time and motion efficiency, however, as shown in FIG. 21, the commencement of the lateral movement of the transport means 80 towards the article unloading station B is preferably intiated momentarily after the article, or funnel F has been lifted clear of the surface of the article loading station A.

Simultaneously, with the energization of control relay CR 4 and its actuation of solenoid valve S1 through control relay contact pair 1 CR 3, control relay CR 4 energizes and closes normally open control relay contact pair 2 CR 4 which in turn actuates the rotary actuator unit 88a, which commences rotary movement of the actuator gear 88e and the orientor gear 89e to which it is peripherally intergeared through idler gear 88f. The turret section 89 of the transport means 80, of course, being fastened to and rotatable with the orientor gear 89e is correspondingly caused to rotate to the same extent as the orientor gear 89e. Also, the transport shaft 85 is correspondingly rotated by virtue of its interconnection through support plate 85d and camrollers 85e and 85f with the turret section guide slots 89p and 89q while at the same time the transport shaft 85 is permitted to be extended or lowered as the camrollers even while being rotated are permitted to move downward within the guide slots 89p and 89q in accompaniment with the transport shaft. The rotary movement is completed during forward shuttle movement of the transport means and the extent of such rotary movement is, as previously described, dependent upon the placement of the pre-set limit stops, not shown, within the housing of the rotary actuator unit 88a. Also, as previously mentioned, the rotary actuator unit may be readily disconnected and rendered inoperative in operations where rotation of the article is either unnecessary or undesirable.

Upon arrival of the transport means 80 and the article at its destination in unloading position above the article unloading station B, another switch plate 93f on the speed reducer shaft 93c and having a peripheral tab 93g will have been rotated to a position which will cause the switch plate tab 93q to close the normally open limit switch 104, which as shown in FIGS. 2 and 3, is preferably mounted adjacent to the speed reducer shaft 93c. Also, as best observed in FIGS. 22 and 23, the switch plate 93f is so arranged on the speed reducer shaft 93c that the peripheral tab 93g will close the limit switch 104 when the drive arm 73a reaches its opposite or upper dead center position where the longitudinal axis of the drive arm 73a is again disposed in radially aligned relationship with the axis of rotation of the speed reducer output drive shaft 93b. The closing or energizing of limit switch 104, as shown in FIG. 28, activates control relay CR 2 which in turn immediately closes and energizes normally open control relay contact pairs 1 CR 2 and 3 CR 2 and conversely opens and deenergizes normally closed control relay contact pair 2 CR 2. The opening of normally closed control relay contact pair 2 CR 2 deenergizes control relay CR 4 and thereby opens and deenergizes control relay contact pairs 1 CR 4 and 2 CR 4. The deenergization of control relay contact pair 1 CR 4 deactivates solenoid valve S1 which in turn disengages the clutch brake 92 and terminates the forward movement of the transport means 80, shuttle means 60, etc. along the carrier guide track 40 and tilt track 50 to halt the transport means 60 in unloading position above the article unloading station B. The deenerization of control relay contact pair 2 CR 4 simultaneously deactivates solenoid valve S2 which, in turn, turns off the rotary actuator unit 88a. Concurrently, the closing of the normally open control relay contact pair 1 CR 2 activates solenoid valve S4 through normally closed timer delay contact pair 2 TD 2 and causes piston head 85a to move downward and extend or lower transport shaft 85 and article chuck 80a by the admission of fluid pressure into the pressurizable chamber section 87 through the upper fluid pressure conduit 87z exhaustion of fluid pressure through the lower fluid pressure conduit 87j.

Also concurrently with the activation of the circuit for lowering the transport shaft 85, the closing and energizing of normally open control relay contact pair 3 CR 2 activates timer delay TD 2 which has a timer delay sequence which in turn withholds opening of normally closed timer delay contact pairs 1 TD 2 and 2 TD 2 until the transport shaft 85 has been fully extended or lowered to deposit the article in precisely oriented position on the surface of the article unloading station B. Following deposit of the article, such as funnel F, on the surface of the article unloading station, timer delay TD 2 times out and deactivates normally closed timer delay contact pairs 1 TD 2 and 2 TD 2, which respectfully, in turn deactivate solenoid valve S4 and control relay CR 3. Deactivation of control relay CR 3 in turn opens control relay contact pair 2 CR 3 which deactivates solenoid valve S3 and terminates the vacuum through vacuum supply conduit 80b to the article chuck 80a, whereby the article, or funnel F, is released from the article chuck. Concurrently, deactivation of solenoid valve S4, in turn, reverses the functions of the fluid pressure conduits 87j and 87z thereby causing the piston head 85a to raise or retract the transport shaft 85 and article chuck 80a.

The timing out of timer delay TD 2 also closes and energizes normally open timer delay contact pair 3 TD 2 which, in turn, activates timer delay TD 4, which following a brief time delay of sufficient duration to permit the rising article chuck to clear the article deposited at the article unloading station B, then times out and closes normally open timer delay contact pair 1 TD 4, which, in turn, activates control relay CR 5, through normally closed limit switch 103. The activation of control relay CR 5 in turn closes and energizes normally closed control relay contact pairs 1 CR 5, 2 CR 5 and 3 CR 5. Control relay contact pair 2 CR 5 which is in parallel with timer delay contact pair 1 TD 4 and in series with normally closed limit switch 103 locks in control relay CR 5 so that the energization of control relay CR 5 remains unaffected by the deactivation of timer delay contact pair 1 TD 4 prior to deactivation by the opening of normally closed limit switch 103.

Energized control relay contact pair 1 CR 5 reactivates the clutch brake 92 and causes it to engage with the continuous motor 91 and initiate rotation of the speed reducer through its return drive cycle which, of course, causes the shuttle means 60 and transport means 80 to return along the carrier guide track 40 and tilt track 50 to the article loading position. The energization of control relay contact pair 3 CR 5 reactivates solenoid valve S2 which in turn reactivates the rotary actuator unit 88a and causes it to rotate in accordance with its preset limit stops to the position which it previously occupied at the loading position above article loading station A.

Moreover, the rotation of the switch plate 93f accompanying rotation of the speed reducer drive shaft 93c to return the transport means to the article loading station A, causes the switch plate tab 93g to release the limit switch 104 and permit it to return to its normally open position, thereby deactivating control relay CR 2 and permitting control relay contact pairs 1 CR 2 and 3 CR 2 to return to their normally open positions and permitting control relay contact pair 2 CR 2 to return to its normally closed position. Upon return arrival of the shuttle means 60 and transport means 80 at the loading position, normally closed limit switch 103 will be opened by contact with the switch plate tab 93e on the speed reducer drive shaft 93c, and the opening of limit switch 103, in turn, will open control relay CR 6 to stop the transport means in its properly oriented position above the article loading station A and with the shuttle means side plate 60d in contact with and closing normally open limit switch 101 preparatory to repeating the article transfer operation just described depending upon the presence of an article at the article loading station A in contact with and closing normally open limit switch 102.

During the foregoing description of the mode of operation, the transfer apparatus had been of course, previously adjusted to effect the desired particular positioning and orientation of the article, such as the funnel F, at the article unloading station B. Such adjustments will now be described. Prior to operation of the transfer apparatus, the article unloading station B is properly situated in the path of travel of the transport means 80 and is initially positioned and oriented in such manner that an article, such as a funnel F, placed thereon will occupy the properly oriented position desired. Having established the desired positioning and orientation of the article unloading station B and the article thereon, the transfer apparatus is adjusted to transfer and deliver an article from the article loading station A to the article unloading station B in conformity to such preestablished positioning and orientation. To do so, the various adjustment mechanisms are adjusted to correspond to the adjustments necessary for the precise positioning and orientation of the article, such as the funnel F, when it is deposited at the article unloading station B. In effecting such adjustments, the transport means 80 is first positioned and oriented in proper loading position above the article loading station A. When so positioned and oriented the height of the axis, as at 83e, of the transport means stub shaft 83 above the surface of the article loading station A is determined for subsequent use as the fixed predetermined height, or perpendicularly interspaced distance of the stub shaft above the surface of the article unloading station B. Thereafter, the speed reducer shaft 93c and crank arm 73k are rotated to shift the transport means 80 and its associated shuttle means 60 and tilt arm assembly 57 to a position on the guide track 40 and tilt track 50 overlying the article unloading station B. At such position, the selectively adjustable actuator means 73 is loosened at its interconnection with the pivotally oscillatable means 70 by loosening the retaining nut 73g sufficiently to permit the drive arm connecting pin 73j to shift within the arcuate slot at 70j in the stroke control bracket 70g. Also, at this time the pivot pin 45b for the adjustable track mounting plate 45 is loosened to accommodate elevational adjustments of the carrier guide track 40. Thereafter, the transport apparatus is adjusted to bring the chuck 80a into its desired article gripping position on the surface of the article. In the case of a funnel component, such as the funnel F, the transport means 80 when so positioned will be arranged in such manner that the longitudinal axis of the transport shaft 85 is oriented in coaxial alignment with the central longitudinal axis of the narrow neck portion of the funnel and in which position it will also be disposed in perpendicular relationship with the article supporting surface of the article unloading station B. The requisite adjustments of the transport means which permit the transport shaft 85 and the article chuck 80a to release the article in precisely oriented position on the surface of the article unloading station B is then cooperatively effected by adjustment of the elevation of the carrier guide track 40 through its elevational adjustment means 43, in conjunction with lateral movement of the transport means 80 along the carrier guide track 40 to ultimately bring the stub shaft axis 83e into proper position, whereat the perpendicularly spaced distance of the stub shaft axis 83e from the surface of the article unloading station B is the same as its previously determined perpendicularly spaced distance from the surface of the article loading station A, and whereat the stub shaft axis perpendicularly intersects a preselected inclined plane or axis which in the presently described embodiment is the central longitudinal axis of the narrow neck portion of the funnel F. After thus positioning the stub shaft axis 83e in its proper established position, the desired angular adjustment of the transport shaft 85 relative to the surface of the article unloading station B may be carried out by elevational adjustment of the tilt track 50 through its elevational adjustment means 53.

The foregoing elevational adjustments of the carrier guide track 40 and the tilt track 50 are, of course, carried out by adjusting the elevationally adjustable end portion 40a of the carrier guide track 40 by means of the turning of the jack screw 43a, and in conjunction with the elevational adjustments made in the carrier guide track by turning the jack screw 53a to similarly adjust the elevation of the elevationally adjustable end portion 50a of the tilt track 50. Following attainment of the desired elevational positioning of the guide track 40 and tilt track 50, the previously loosened pivot pins 45b and 55a for the adjustable track mounting plate 45 and tilt track mounting bracket 55 are again securely tightened.

Also, the speed reducer output drive shaft 93c is rotated to bring the crank arm 73k into its top dead center position; at which position, as best observed in FIG. 18, the drive arm 73a will be radially aligned with the axis of rotation of the output drive shaft 93c. When such top dead center positioning is attained, the previously loosened connecting pin 73j is locked in position in the arcuate slot at 70j in the stroke control bracket 70g by tightening the retaining nut 73g. When thus tightened, the article unloading position of the transport means is fixed. The established article unloading position is then coordinated with the deactivation of the clutch brake 92 by rotatively repositioning the switch plate 93f on the speed reducer shaft 93c to a position, such as shown in FIGS. 22 and 23, in which the peripheral tab 93g of the switch plate presses against and closes the normally open limit switch 104 controlling the operation of the clutch brake 92. At this point, all necessary adjustments will have been completed, except for the extent of rotation of the article, if any, desired. If rotation is desired, the limit stops controlling the extent of rotation for the rotary actuator unit 88a are then set to provide the desired extent of rotation of the article. Having thus established the desired elevation, angular orientation and extent of travel and rotation of the transport means relative to the surface of the article unloading station B the transport apparatus may be returned to the article loading position for commencement of operation. Thus, it will be appreciated that the transport apparatus may be readily and precisely oriented relative to the article unloading station B by merely adjusting the carrier guide track means 40 through its elevational adjustment means 43, in conjunction with the adjustment of the tilt track 50 through its elevational adjustment means 53 by adjusting the stroke of the pivotally oscillatable means 70 through adjustment of the crank arm 73k and drive arm 73a in top dead center position and within the arcuate slot 70j in the stroke control bracket 70g, and by adjustment of the extent of rotation, if desired, of the article through setting of the limit stops conventionally provided for such purpose in the rotary actuator unit 88a.

By virtue of the unique interrelationship of the various adjustment means, none of the various aforementioned adjustments made to properly position and orient the article at the article unloading station B will affect the positioning or orientation of the transfer apparatus with respect to its loading position at the article loading station A. As best observed by reference to FIGS. 17, 26 and 27, elevational adjustments made by the elevational adjustment means 43 to the elevationally adjustable end position 40a of the carrier guide track 40 causes the opposite end portion 40b of the guide track 40 to pivot the adjustable track mounting plate 45 about the central horizontally disposed axis of pivot pin 45b. However, as will be observed with reference to the vertical alignment (FIG. 17) and the horizontal alignment (FIG. 26) of the pivot pin 45b, the pivot axis of pivot pin 45b coaxially coincides with the longitudinal axis of the stub shaft 83. Similarly, comparative reference to FIGS. 17 and 27 will reveal that the horizontally disposed pivot axis of the pivot pin 55a and the horizontally disposed pivot axis of the spindle shaft 57e of the tilt arm assembly 57 similarly coaxially coincide. Thus, elevational adjustments of the tilt track 50 produce no effect with regard to the position of the tilt arm assembly 57 when the transport means 80 is in loading position above the work loading station A. Similarly, adjustments to change the extent of travel of the transport means 80 toward the article unloading station B by changing the extent of the stroke of the pivotally oscillatable means 70 will not alter the article loading position of the transfer apparatus at the article loading station A, since the arcuate slot at 70j in the stroke control bracket 70g is, as previously described, concentric with the axis of rotation of the speed reducer output drive shaft 93b. Hence, although the extent of travel is capable of adjustment, the actuator arm 73a and crank arm 73k of the selectively adjustable actuator means 73 will always return the drive end portion 70k of the drive arm 70c, and, in turn, the stub shaft 83 and transport means 80 to the same loading position. In brief, an important feature of the present invention is that the position and orientation of the article transfer means at the article loading position above the article loading station A will remain unaffected by such readjustments as may be desired or necessitated at the article unloading station B. Another important feature of the actuator means resides in the accelleration and deceleration of movement which it imparts to the transport means 80. When the crank arm 73k is approaching close to either its top dead center or bottom dead center position the lateral movement of the transport means is caused to decelerate. Conversely, as the crank arm 73k departs from either its top dead center or bottom dead center positions it caused the lateral movement of the transport means to accellerate. Hence, the transport means is capable of efficient operation while at the same time avoiding substantial vibrations associated with sudden starting and stopping of the apparatus.

It will also be clearly apparent that the previously described transfer apparatus of the present invention may be readily converted to operate in reverse manner so as to pick up or load articles at station B and transfer and unload such articles at station A with only small changes in the mode of operation of the transfer apparatus. Moreover, it will, of course, be clearly understood that the foregoing description is exemplary only of a preferred embodiment and that various details of construction may be modified throughout a wide range of equivalents without departing from the principles of this invention or the spirit and scope of the appended claims.

We claim:

1. A method for the transport of a generally frusto-conically shaped article having a vertical axis passing through the center of both ends of said article from an article loading station to an article unloading station which comprises the steps of:

grasping said frusto-conically shaped article at said article loading station;

rectilinearly transporting said frusto-conically shaped article from said article loading station to said article unloading station;

simultaneously with said transporting, tilting said frusto-conically shaped article to achieve a positional orientation corresponding to the axis of orientation of said article unloading station;

simultaneously with said transporting and tilting, rotating said frusto-conically shaped article about its vertical axis to achieve rotational alignment with said article unloading station;

ceasing said transporting at said article unloading station; and releasing said frusto-conically shaped article at said article unloading station while still in the tilted and rotated orientation achieved during said transporting.

2. The method of claim 1 which further includes the steps of:

sensing the absence or presence of an article at said article loading station; and initiating the grasping of said article only in response to the presence of an article at said article loading station.

3. The method of claim 1 which further includes the step of:

simultaneously with said transporting, lowering said article to thereby deliver said article at said unloading station at a vertical elevation below said loading station.

4. The method of claim 1 which further includes the step of:

simultaneously with said transporting, raising said article to thereby deliver said article at said unloading station at a vertical elevation above said loading station.

* * * * *